INVENTOR
HARRY W. COCHRANE
BY [signature]
ATTORNEY

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 4

FIG. 3

ALPHA-NUMERIC CODE

| CHARACTER | EQUIVALENT CARD CODE REPRESENTATION | | CHARACTER CODE | | | | | | | | | | |
|---|---|---|---|---|---|---|---|---|---|---|---|---|---|
| | | | CHARACTER ZONE | | | | | | CHARACTER DIGIT | | | | |
| NUMERIC | ZONE | DIGIT | 0 | 1 | 2 | 3 | 6 | | 0 | 1 | 2 | 3 | 6 |
| 0 | – | 0 | – | – | – | – | – | | 1 | 0 | 0 | 1 | 0 |
| 1 | – | 1 | – | – | – | – | – | | 1 | 1 | 0 | 0 | 0 |
| 2 | – | 2 | – | – | – | – | – | | 1 | 0 | 1 | 0 | 0 |
| 3 | – | 3 | – | – | – | – | – | | 0 | 1 | 1 | 0 | 0 |
| 4 | – | 4 | – | – | – | – | – | | 0 | 1 | 0 | 1 | 0 |
| 5 | – | 5 | – | – | – | – | – | | 0 | 0 | 1 | 1 | 0 |
| 6 | – | 6 | – | – | – | – | – | | 1 | 0 | 0 | 0 | 1 |
| 7 | – | 7 | – | – | – | – | – | | 0 | 1 | 0 | 0 | 1 |
| 8 | – | 8 | – | – | – | – | – | | 0 | 0 | 1 | 0 | 1 |
| 9 | – | 9 | – | – | – | – | – | | 0 | 0 | 0 | 1 | 1 |
| ALPHABETIC | | | CHARACTER ZONE | | | | | | CHARACTER DIGIT | | | | |
| | | | 0 | 1 | 2 | 3 | 6 | | 0 | 1 | 2 | 3 | 6 |
| A | 0 | 1 | 1 | 0 | 0 | 1 | 0 | | 1 | 1 | 0 | 0 | 0 |
| B | 0 | 2 | 1 | 0 | 0 | 1 | 0 | | 1 | 0 | 1 | 0 | 0 |
| C | 0 | 3 | 1 | 0 | 0 | 1 | 0 | | 0 | 1 | 1 | 0 | 0 |
| D | 0 | 4 | 1 | 0 | 0 | 1 | 0 | | 0 | 1 | 0 | 1 | 0 |
| E | 0 | 5 | 1 | 0 | 0 | 1 | 0 | | 0 | 0 | 1 | 1 | 0 |
| F | 0 | 6 | 1 | 0 | 0 | 1 | 0 | | 1 | 0 | 0 | 0 | 1 |
| G | 0 | 7 | 1 | 0 | 0 | 1 | 0 | | 0 | 1 | 0 | 0 | 1 |
| H | 0 | 8 | 1 | 0 | 0 | 1 | 0 | | 0 | 0 | 1 | 0 | 1 |
| I | 0 | 9 | 1 | 0 | 0 | 1 | 0 | | 0 | 0 | 0 | 1 | 1 |
| J | 1 | 1 | 1 | 1 | 0 | 0 | 0 | | 1 | 1 | 0 | 0 | 0 |
| K | 1 | 2 | 1 | 1 | 0 | 0 | 0 | | 1 | 0 | 1 | 0 | 0 |
| L | 1 | 3 | 1 | 1 | 0 | 0 | 0 | | 0 | 1 | 1 | 0 | 0 |
| M | 1 | 4 | 1 | 1 | 0 | 0 | 0 | | 0 | 1 | 0 | 1 | 0 |
| N | 1 | 5 | 1 | 1 | 0 | 0 | 0 | | 0 | 0 | 1 | 1 | 0 |
| O | 1 | 6 | 1 | 1 | 0 | 0 | 0 | | 1 | 0 | 0 | 0 | 1 |
| P | 1 | 7 | 1 | 1 | 0 | 0 | 0 | | 0 | 1 | 0 | 0 | 1 |
| Q | 1 | 8 | 1 | 1 | 0 | 0 | 0 | | 0 | 0 | 1 | 0 | 1 |
| R | 1 | 9 | 1 | 1 | 0 | 0 | 0 | | 0 | 0 | 0 | 1 | 1 |
| S | 2 | 2 | 1 | 0 | 1 | 0 | 0 | | 1 | 0 | 1 | 0 | 0 |
| T | 2 | 3 | 1 | 0 | 1 | 0 | 0 | | 0 | 1 | 1 | 0 | 0 |
| U | 2 | 4 | 1 | 0 | 1 | 0 | 0 | | 0 | 1 | 0 | 1 | 0 |
| V | 2 | 5 | 1 | 0 | 1 | 0 | 0 | | 0 | 0 | 1 | 1 | 0 |
| W | 2 | 6 | 1 | 0 | 1 | 0 | 0 | | 1 | 0 | 0 | 0 | 1 |
| X | 2 | 7 | 1 | 0 | 1 | 0 | 0 | | 0 | 1 | 0 | 0 | 1 |
| Y | 2 | 8 | 1 | 0 | 1 | 0 | 0 | | 0 | 0 | 1 | 0 | 1 |
| Z | 2 | 9 | 1 | 0 | 1 | 0 | 0 | | 0 | 0 | 0 | 1 | 1 |

| | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 5 | 6 | 7 | 8 | 9 | 10 |
| 2 | 2 | 3 | 4 | 5 | 6 | 7 | 8 | 9 | 10 | 11 |
| 3 | 3 | 4 | 5 | 6 | 7 | 8 | 9 | 10 | 11 | 12 |
| 4 | 4 | 5 | 6 | 7 | 8 | 9 | 10 | 11 | 12 | 13 |
| 5 | 5 | 6 | 7 | 8 | 9 | 10 | 11 | 12 | 13 | 14 |
| 6 | 6 | 7 | 8 | 9 | 10 | 11 | 12 | 13 | 14 | 15 |
| 7 | 7 | 8 | 9 | 10 | 11 | 12 | 13 | 14 | 15 | 16 |
| 8 | 8 | 9 | 10 | 11 | 12 | 13 | 14 | 15 | 16 | 17 |
| 9 | 9 | 10 | 11 | 12 | 13 | 14 | 15 | 16 | 17 | 18 |

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 9

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 10

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 11

PARTIAL SUM AND INITIAL CARRY GENERATOR

FROM STORAGE REGISTER (Y INPUTS)

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 12

Jan. 19, 1965 H. W. COCHRANE 3,166,669

CORE MATRIX CODED DECIMAL PARALLEL ADDER UTILIZING PROPAGATED CARRIES

Original Filed June 28, 1960 17 Sheets-Sheet 14

ONE DIGIT POSITION OF
TOTAL SUM GENERATOR 3,166,669
Patented Jan. 19, 1965

3,166,669

CORE MATRIX CODED DECIMAL PARALLEL ADDER UTILIZING PROPAGATED CARRIES

Harry W. Cochrane, Poughkeepsie, N.Y., assignor to International Business Machines Corporation, New York, N.Y., a corporation of New York Original application June 28, 1960, Ser. No. 39,315. Divided and this application Dec. 26, 1961, Ser. No. 164,642
9 Claims. (Cl. 235—175)

This application is a division of copending application Serial No. 39,315, filed June 28, 1960.

This invention relates to information handling and data processing machines or devices and more particularly to a core matrix adder.

General objects of the invention are to increase computer performance per unit cost, to increase speed of operation, reduce unit costs, and improve reliability of operation particularly in computers of the type that employ stored programs and which may be controlled by standard programming methods.

A specific object is to provide an improved parallel adder.

Another object is to provide a parallel adder utilizing core matrices.

A further object of the invention is to provide a number of core matrices making up an adder including a matrix which generates propagated carries in developing a final sum.

A feature of the invention is an extended use of core matrices in arithmetic and logic operations as well as in memory units and in programming, including branch programming.

A specific feature is an improved adder and method of addition.

Another feature is a propagated carry generator.

A core matrix as used herein is a group of magnetic cores which are interlinked by a plurality of conductors, each of which conductors is coupled to one or more of the cores in the group.

A core or magnetic core as used herein is composed of magnetic material which exhibits a hysteresis effect. In one typical form, such a core may be employed as a bistable device. Thus if driven magnetically in one direction, as by means of one or more conductors coupled to the core, it will assume one magnetized state and will remain substantially indefinitely in that state until, by the application of sufficient magnetizing force in the opposite sense, as by means of the same or other conductors, it may be driven magnetically in the opposite direction. The transition from one state to the other will produce, in any conductor coupled to the core, a useful output signal of one polarity or the other depending upon the direction of the transition. The two stable states of such a core may be used to represent respective items of information; for example, one state may be used to represent the binary digit "one" and the other state may be used to represent the binary digit "zero."

Although magnetic cores have been illustrated herein for use as storage elements in the system described herein, it will be understood that other types of storage elements may be employed instead in the system.

The terms "line," "conductor," and "winding" will be used herein interchangeably to mean a conductor such as may be coupled to one or more cores.

The normal state of a core will generally be designated as the "zero" state. A core may be "set up," "set on" or switched whereupon it will then assume or be "flipped" into the "one" state. To flip a core requires the passage of at least a certain minimum amount of current through a wire coupled to the core and this current must be in the proper direction to reverse the magnetic flux in the core.

Magnetic cores made of ferrite, of toroidal shape and as small as 0.030 inch inside diameter and 0.050 inch outside diameter may be used. Such cores permit the assembling of complicated matrices in very limited spaces. Coupling sufficient for the purposes of the invention is obtainable by threading a wire once through the toroidal core. Where, as in some of the matrices described herein, many wires are required to be threaded through a single core, wires as small as No. 36 or smaller may be used with cores as small as 0.050 inch inside diameter and 0.080 inch outside diameter. These cores are smaller than cores generally known as switching cores, require less power to operate, less magnetomotive force to effect a reversal of state, and in the system described herein, provide rapid operation.

In the known "half-select" method of selectively setting on one or more cores in a matrix while leaving other cores in whichever state each such core happens to be in, pulses each of half the amount required to set up a core may be passed simultaneously through two separate conductors coupled to the core in like polarity and these pulses will combine their effects to set up the core. Each such pulse is called a "half-select pulse." A core which receives only one half-select pulse over the totality of conductors coupled thereto will not be set up, and, upon cessation of the current will return to its "zero" state. By the application of half-select pulses to a group of cores, one core may be set up to the exclusion of all other cores in the group. This occurs where two conductors each carrying a half-select pulse are each coupled to a plurality of cores and one or more of the cores is coupled to both conductors.

A core is said to be "inhibited" if a conductor coupled to the core is carrying a current, of suitable magnitude, opposed in direction to the select current. An "uninhibited core" is one to which no inhibiting current is applied. An uninhibited core may be flipped by a conductor carrying a select current or a current of greater amplitude than a select current.

In certain portions of the illustrative system described herein, instead of using a half-select principle of operation, an arrangement is employed for applying inhibit currents of large amplitude to cores which are not to be selected, and for applying a "write" current, for flipping uninhibited cores, of correspondingly large amplitude, providing its amplitude does not exceed the amplitude of the inhibit current in the cores that are not to be flipped. The inhibit and write-in currents may be several times larger than would be necessary to write into an uninhibited core. Accordingly, very reliable and rapid action may be obtained by "over-driving" the uninhibited core. At the same time, inhibited cores will not be flipped. It is assumed that all the cores involved are initially in the same state, usually the zero state. In the case of saturable cores, the inhibiting magnetomotive force and the write-in magnetomotive force preferably exceed, as by several times, the minimum magnitude of magnetomotive force necessary to saturate an ininhibited core.

This over-drive inhibit principle is used herein for selectively setting up cores in a matrix, being used in some instances instead of the half-select principle.

To read out the information in a core, a read-out pulse of current is impressed upon a conductor coupled to the core. This current is made opposite to a select pulse in its effect upon the state of the core. It will be noted that the direction of the read-out current is the same as the direction of an inhibit current, but the amplitude of the read-out current will generally be less than the amplitude of the inhibit current, the amplitude of the read-out current being about the same as the amplitude of a select current. That is, the read-out current or read-out pulse is of a polarity and amplitude to return a set-on core to its normal or "off" state, usually the "zero" state, and to provide an output pulse from the core if and only if said core has previously been switched to its other stable state, as by either the half-select principle procedure or by the inhibit principle procedure combined with a "write" pulse. Each core in a matrix is coupled to one or more output windings known as "sense lines" which carry a pulse when the core is switched from the one state to the other. In general, there will be employed a plurality of sense lines each of which is coupled to a plurality of cores, so that when any one of the cores coupled to this sense line has a read-out pulse impressed upon a "read-out" line coupled to the core, an output pulse will appear in the associated sense line, provided the core previously has been switched to the "one" or "on" state.

In the embodiment illustrated herein, there are provided a core matrix memory unit and one or more operation performing or functional core matrix units, in particular, an arithmetic unit and one or more logic units. There are also provided a plurality of registers including a storage register, an accumulator register and a control information or operation code register. Each register has associated therewith an input gate individual thereto. A plurality of sense lines pass through all the core matrix units. Each sense line is coupled to one or more cores in each matrix in such a way that when a matrix is subjected to a read-out operation, output pulses are generated in those of the sense lines that are coupled to one or more cores which have previously been set on by a write-in operation. Since the sense lines as a group pass through a plurality of matrix units, the sense lines will be referred to as common sense lines.

A first set of inhibit core drivers is provided, the general purpose of which is to impress inhibit currents upon those cores in any given matrix which are to be prevented from being set on when a write-in operation is performed. Inhibit lines from the set of drivers are connected serially through the various core matrix units and are used on a time sharing basis, for which reason the set of drivers will generally be referred to as common first inhibit drivers. A set of common first inhibit drive lines are provided to convey information for setting up a first pattern of inhibit currents or pulses from one of the registers to the common first inhibit drivers and thence to transmit the required pattern of inhibit currents or pulses to one or more of the core matrix units. In the illustrative embodiment, the common first inhibit drive lines run from the storage register to the common first inhibit drivers and thence to the memory unit, the arithmetic unit and one or more logic units. The arithmetic unit will be said to have first and second input dimensions, meaning that an addend and an augend are presented to the unit over separate systems of drive lines. It will be assumed that the addend is stored in the storage register. The common first inhibit drive lines then impress information about the addend upon a first dimension of the arithmetic unit.

A second set of common drivers is provided which will be referred to as the common second inhibit drivers. A set of common second inhibit drive lines is also provided to convey information for setting up a second pattern of inhibit currents or pulses from another of the registers to the common second inhibit drivers and thence to transmit the required pattern of inhibit currents or pulses to a second dimension of the same core matrix unit to which the first pattern of inhibit currents or pulses is supplied. In the illustrative embodiment, the common second inhibit drive lines run from the accumulator register to the common second inhibit drivers and thence to a second dimension of the arithmetic unit, to impress information about the augend upon the arithmetic unit. They are also extended to one or more other logic units.

Control lines originate in the output of a control pulse generator under control of the control information register or operation code register and connect to the respective gates, both input gates and output gates, to supply gate pulses to the gates selectively as required by the various operations to be performed.

To supply write pulses or read pulses as required, there is provided a set of matrix unit drivers, which are called common unit drivers and may be time shared by various matrix units. A set of common unit drive lines is provided which may be connected to the respective matrix unit drivers when desired. The common unit drive lines are divided into a plurality of parallel branches which connect respectively to the various core matrix units. In each core matrix unit, the unit drive lines connect to the respective matrix unit output gate so that when an output gate pulse is applied to a matrix unit output gate a circuit is completed for the common unit drivers through the selected matrix unit and its associated output gate to supply a read pulse to the matrix unit. In general, each matrix unit is provided with two gates, a read gate which may be regarded as the output gate, and a write gate or input gate whereby a circuit is completed for the common unit drivers to supply a write pulse to the matrix unit.

The control pulse generator is provided with means for selectively energizing the control lines to effect the transfer of either control information or data information over the common sense lines to any one or more of the registers under the joint control of the control lines and of the unit drive lines. In particular, in an addition operation, the selective means incorporated in the control pulses generator is operative to effect the transfer of control or data information from the storage register over the common first inhibit drives lines to the first dimension of the core matrix arithmetic unit and also to effect the transfer of control or data information from the accumulator register over the common second inhibit drive lines to the second dimension of the core matrix arithmetic unit. With information thus having been supplied to two dimensions of the arithmetic unit, the information items may be combined in the arithmetic unit and the result may be put onto the common sense lines for further disposition as desired.

In several of the figures, certain components are shown in block diagram form with letter identifications, for example, triggers T, trigger gates TG, and-circuits A, or-circuits O, core drivers CD, current gates CG, inverter I, emitter followers E, and sense amplifiers SA. Illustrative examples of circuits for such components are shown in FIGS. 31 through 39 of said copending application Serial No. 39,315.

Other objects, features and advantages will appear from the following more detailed description of illustrative embodiments of the invention, which will now be given in conjunction with the accompanying drawings.

In the drawings,

FIG. 1 is a general block diagram of an embodiment of the invention;

FIGS. 2A, 2B, 2C, arranged as shown in FIG. 2 comprise a combination block diagram and flow sheet of an embodiment similar to that shown in FIG. 1;

FIG. 3 is a chart showing an alpha-numeric code suitable for use in a system embodying the invention;

FIGS. 4A and 4B arranged side by side comprise a set of schematic diagrams showing systems of time shared sense lines together with block representations of input gating arrangements for a plurality of registers which may be connected to receive signals from the sense lines on a time sharing basis;

FIG. 5 is a combination block diagram and flow chart of an adder which may be a component of a system embodying the invention, FIG. 5A showing the significance of various lines of flow shown in FIG. 5;

FIGS. 6A and 6B arranged side by side comprise a detailed schematic diagram of an adder of the type shown more generally in FIG. 5;

Figures 5, 5A, 8:
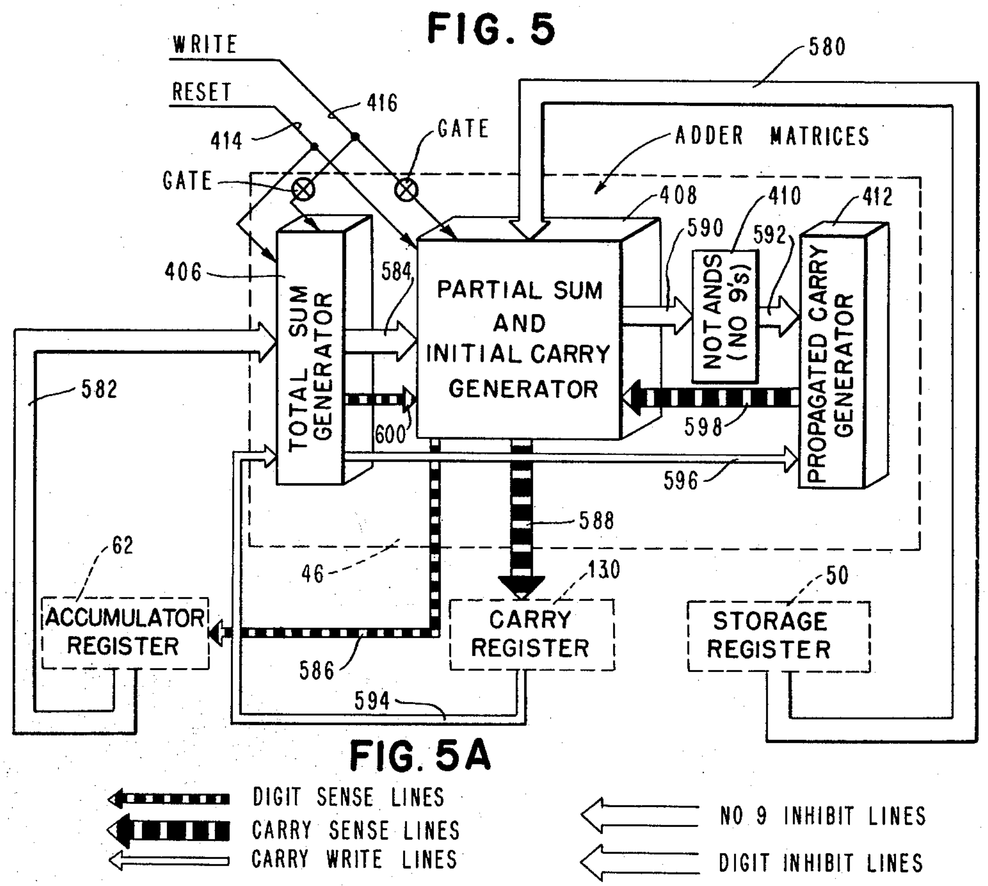
FIG. 8 is a table of addition useful in explaining the operation of the partial sum and initial carry generator.
Figure 6A:
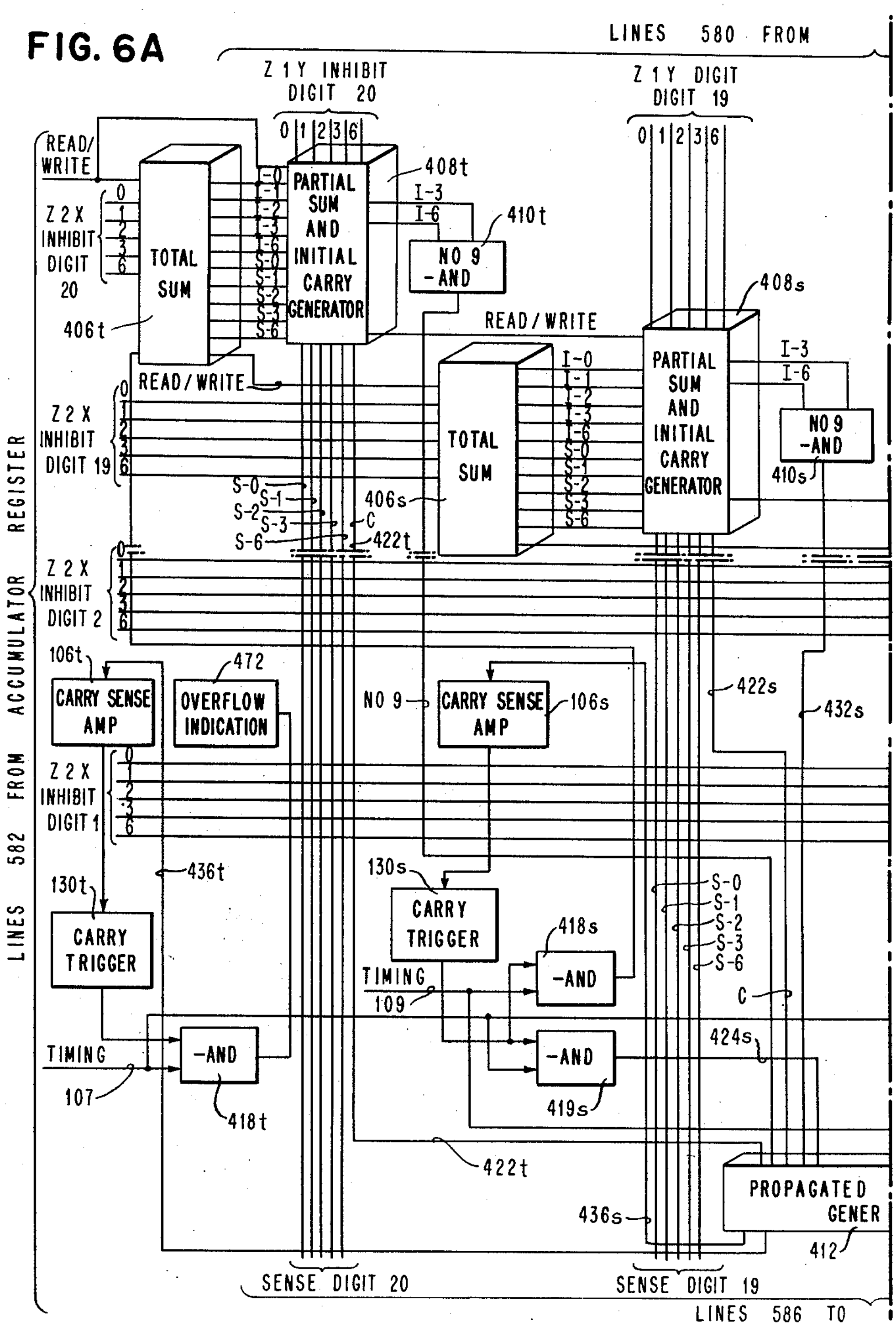
Figure 6B:
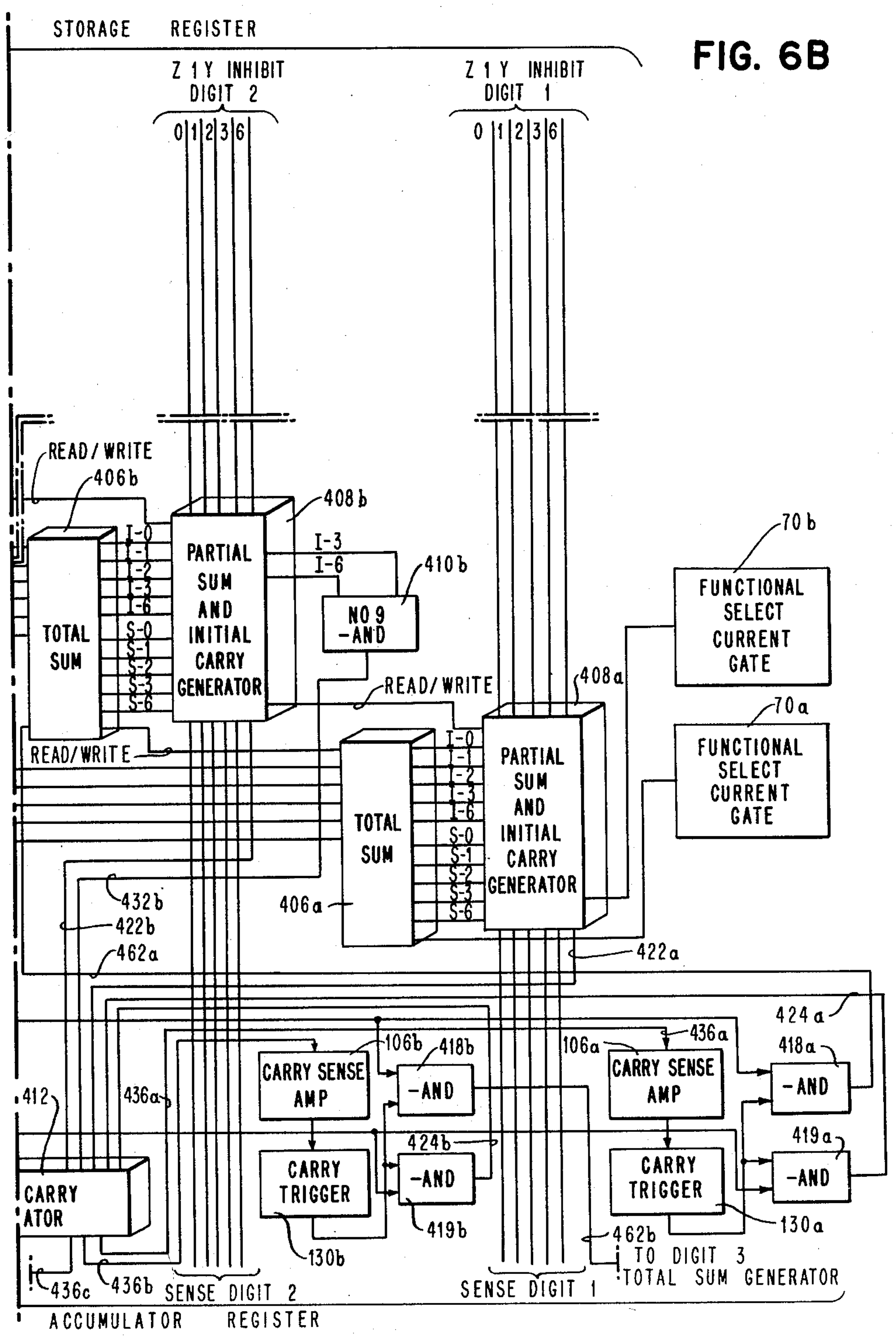
Figure 9A:
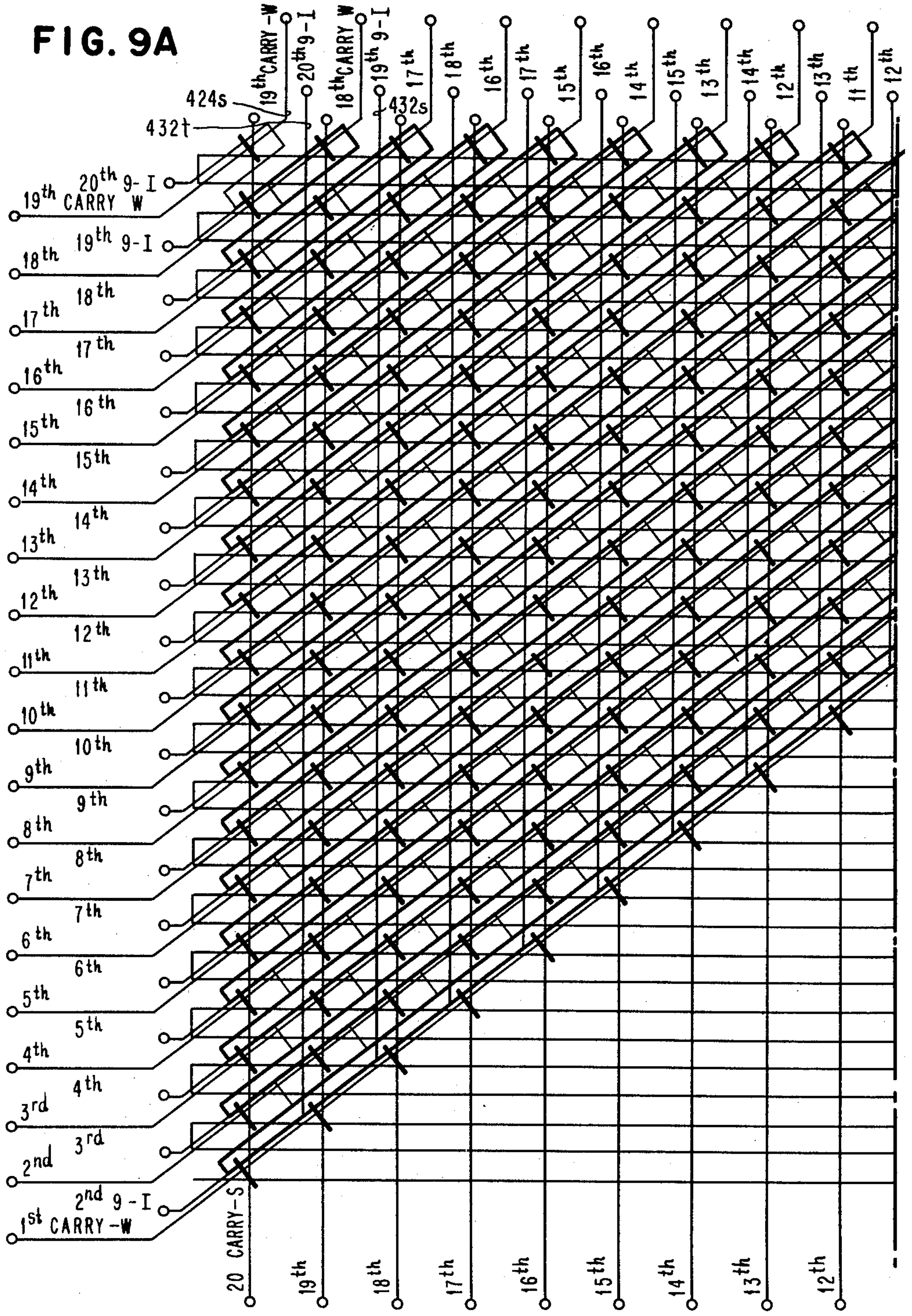
Figure 9B:
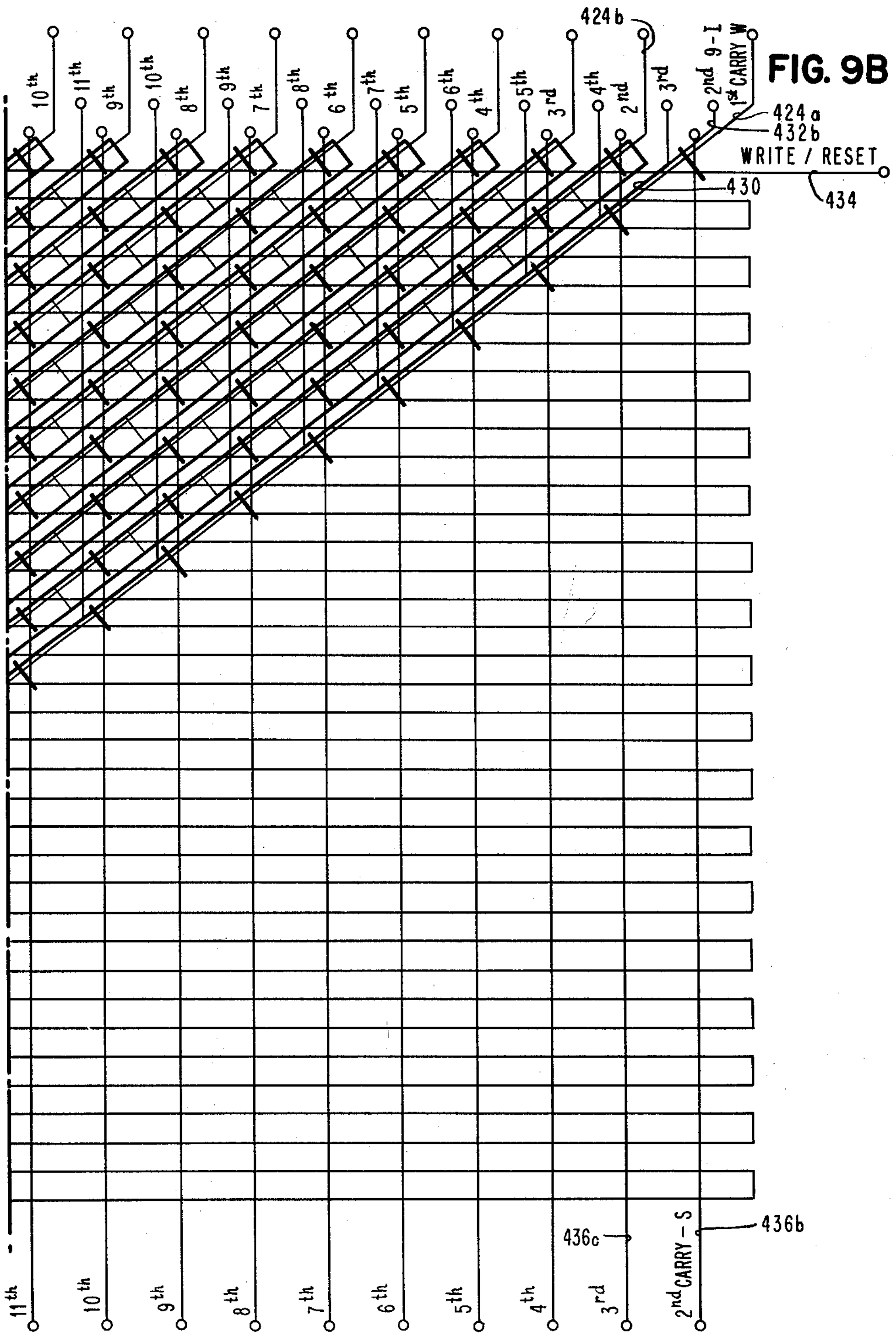
Figure 10:
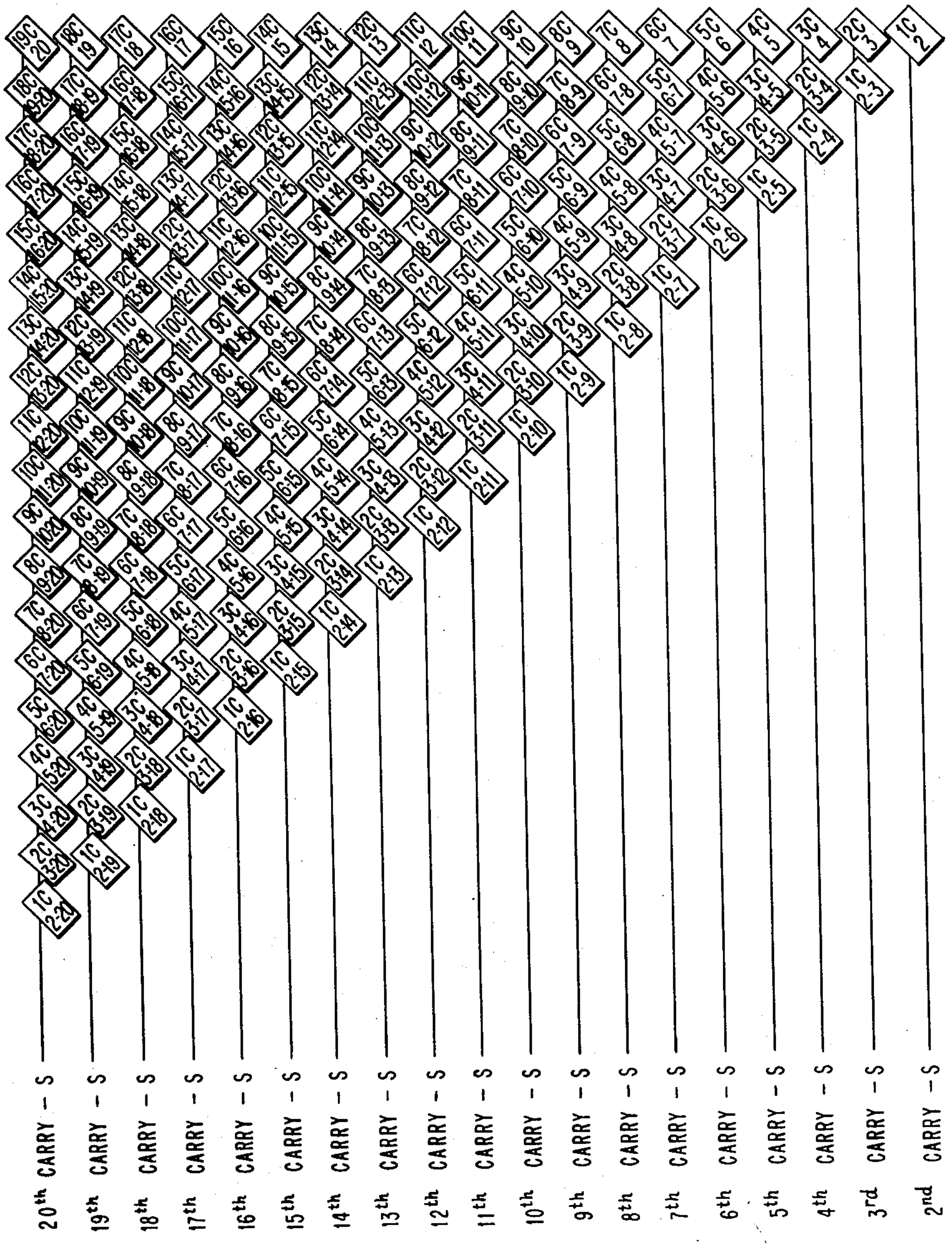
Figure 11A:
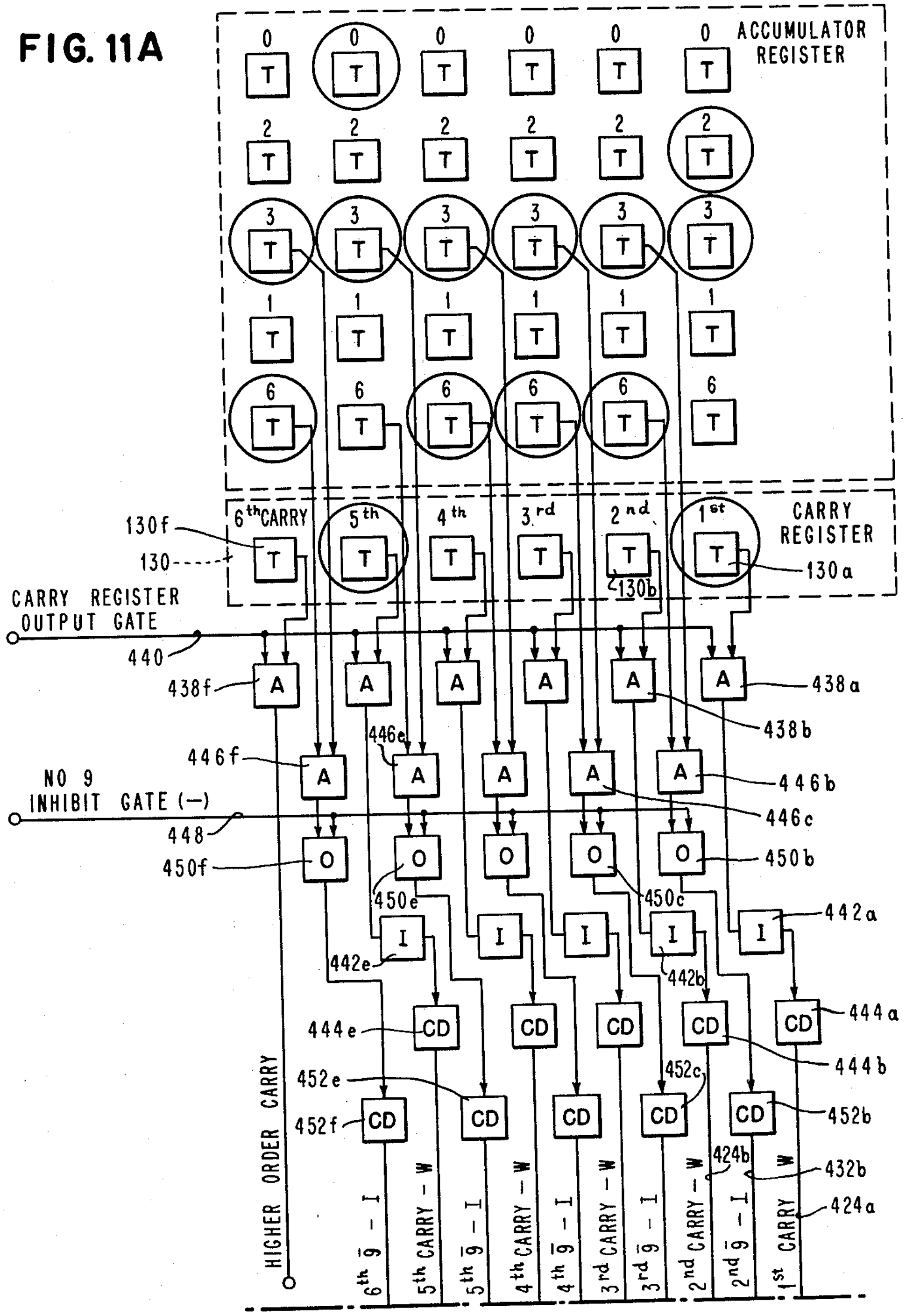
Figure 11B:
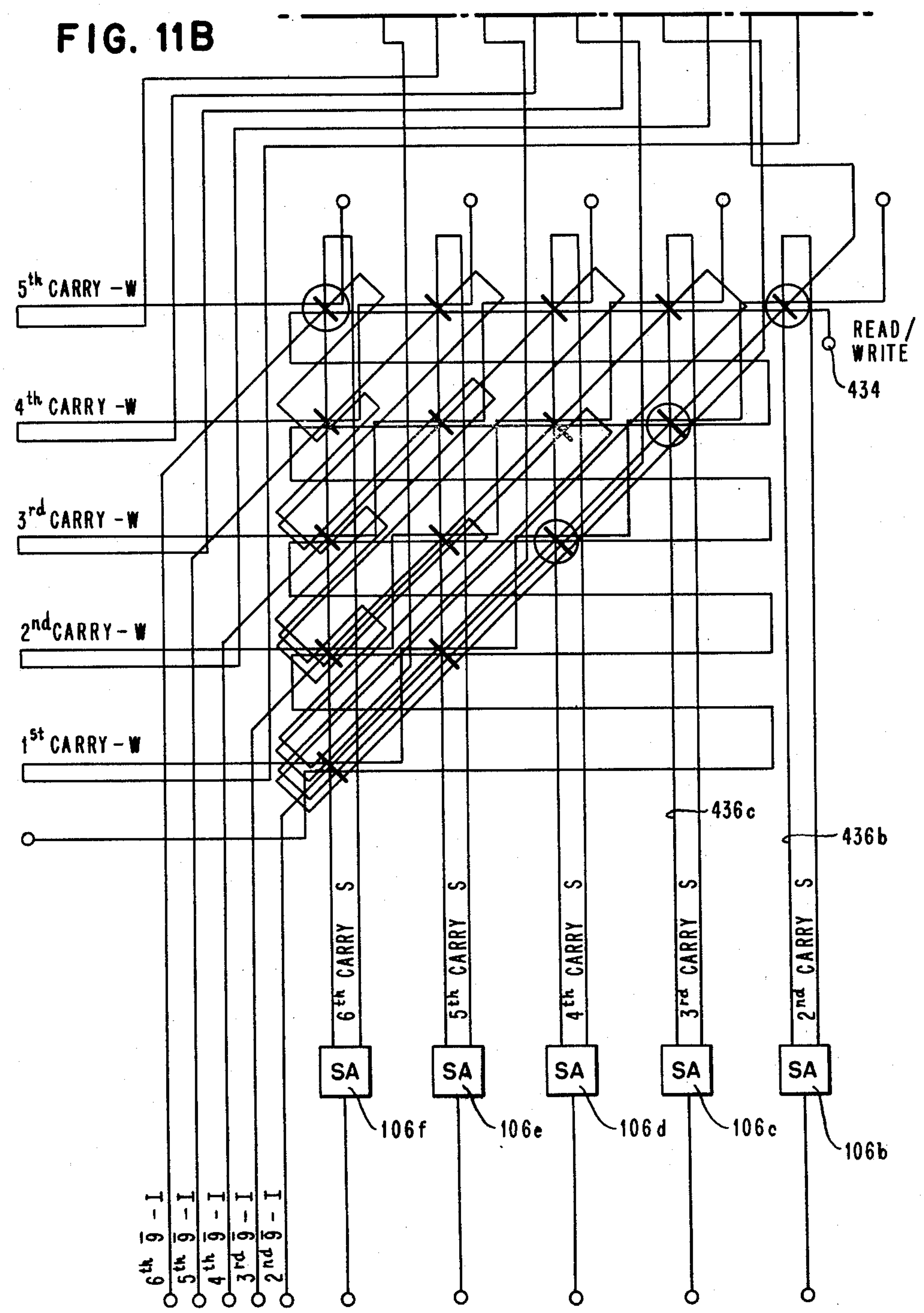
Figure 12:
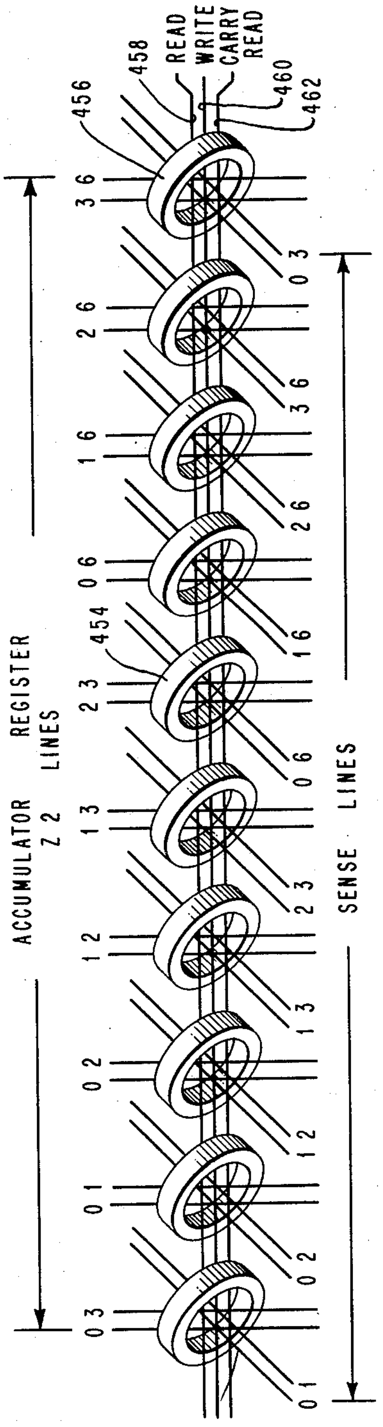

FIGS. 9A and 9B arranged side by side comprise a schematic diagram of a propagated carry generator which may form part of the adder shown in FIGS. 5 and 6;

FIG. 10 is a simplified schematic representation of the wiring scheme of the propagated carry generator shown in the diagram of FIG. 9;

FIGS. 11A and 11B arranged one above the other comprise a schematic diagram of a fragment of an adder of the type shown in FIGS. 5 and 6; and FIG. 12 is a wiring diagram of a total sum generator which may form part of the adder shown in FIGS. 5 and 6.

*Time sharing and internal routing*

Figure 1:
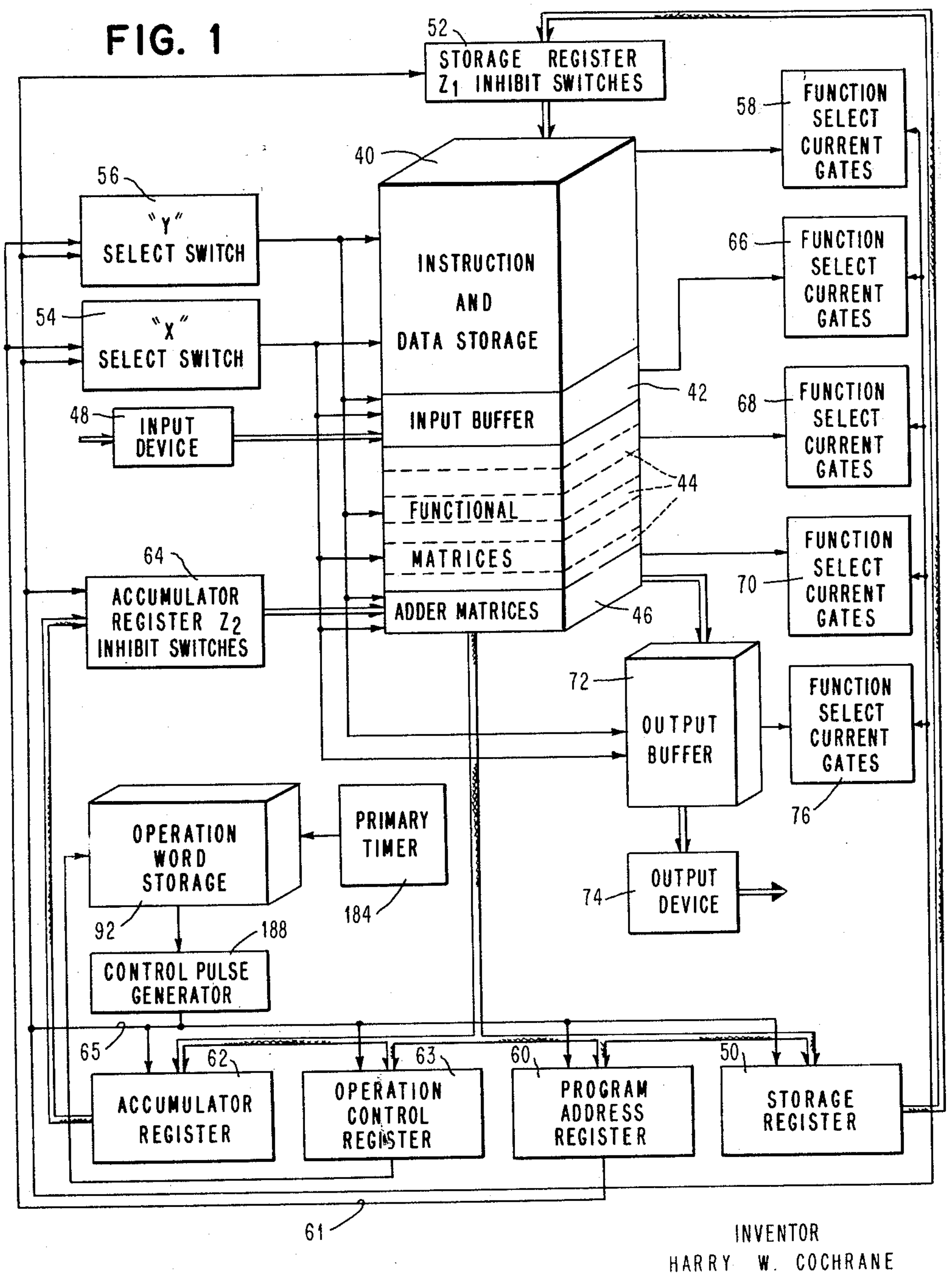

Referring to FIG. 1, an assemblage of core matrices is indicated in block form, comprising an instruction and data storage or memory section 40, an input buffer 42, a plurality of miscellaneous functional matrices 44 and a group 46 of functional matrices specific to addition and subtraction, including carry generation and carry propagation. Instructions and data may be put into the instruction and data storage section 40 by way of the input buffer 42 by means of an input device 48. Information so introduced preferably does not go directly into the storage section 40 from the buffer but is first routed to a storage register 50 over a system of time shared sense lines. These lines pass through the matrix units 40, 42, 44, 46 to the storage register 50, and to a program address register 60, an accumulator register 62 and an operational control register 63, in each of which information may be temporarily stored as by means of triggers. At a suitable time the triggers in the storage register 50 selectively actuate a set of $Z_1$ inhibit switches comprised in block 52, thereby energizing a first set of inhibit drive lines which thread through the assemblage of matrices where they may be made available for use in any matrix by means of input gates individual to the various matrices. Instructions or data may be written into or read out of any selected address in the instruction and data section 40 under the control of an X select switch 54, a Y select switch 56 and a set of function select current gates 58.

An instruction read out of the memory section 40 may be transferred over the common sense lines to the program address register 60 and the operation control register 63 where information contained in the instruction may be stored temporarily and used in the register 60 to control the movement of data or instructions into or out of memory and in the register 63 to control the performance of functional operations upon either data or instructions through an operation word storage unit 92 and a control pulse generator 188 actuated by a primary timer 184. Some of the main control paths are indicated by a cable 61 originating in the register 60 and a cable 65 originating in the control pulse generator 188.

Information on data or instructions may be moved from memory or from any functional matrix to the accumluator register 62 where it may be stored temporarily and use to control a set of $Z_2$ inhibit switches comprised in block 64 to impress the information over a second set of inhibit drive lines upon the adder matrix section 46.

Functional operation of the input device 48 and buffer 42 is controlled by function select current gates comprised in a block 66. Functional operation of the matrices 44 is controlled by a set of function select current gates 68 and functional operation of the adder is controlled by function select current gates 70.

Information may be read out of the computer from any matrix level by way of an output buffer 72 into an output device 74 but preferably does not go directly to the output buffer from the matrices, being routed over the common sense lines to the storage register, from which it goes over inhibit lines to the output buffer.

By routing the bulk of all information transfer always through either the storage register or the accumulator register, error checking may be concentrated in two places, one associated with each said register, thereby facilitating the detection of errors.

Figures 2, 2A:
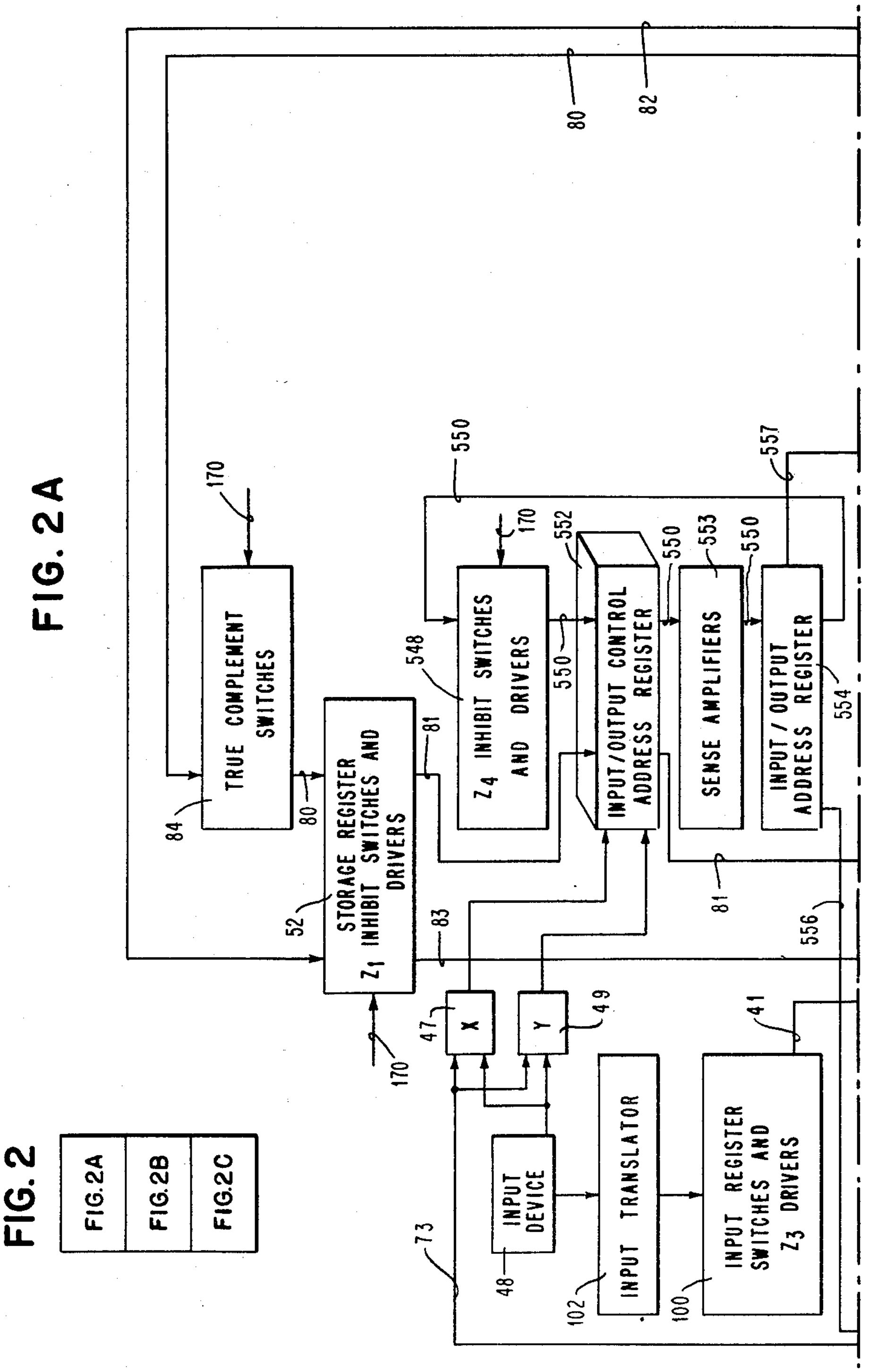
Figure 2B:
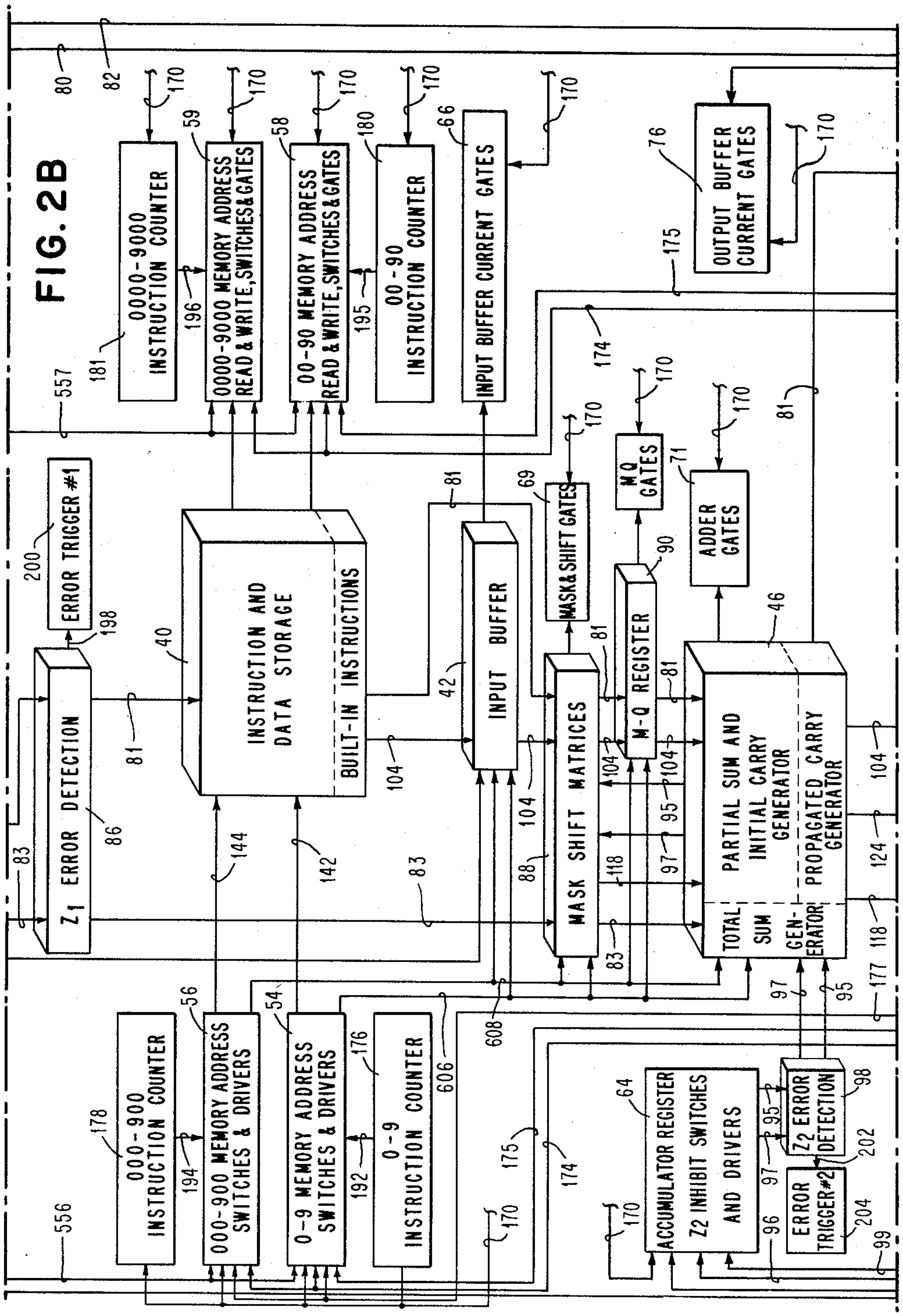
Figure 2C:
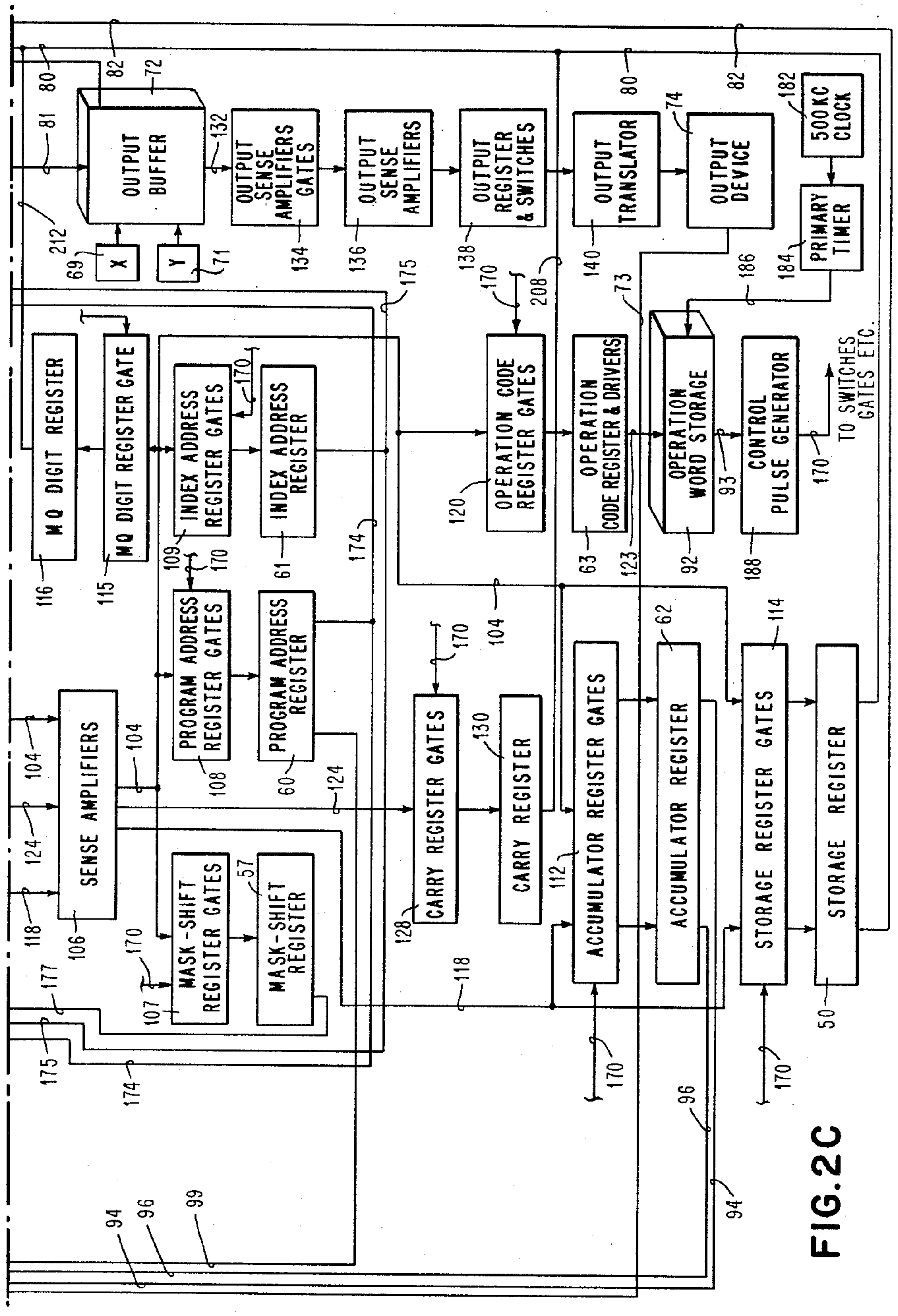

In FIG. 2, the system components shown in FIG. 1 are supplemented by additional components and developed in the form of a flow chart for the flow of instructions and data over the various time shared sets of interconnecting lines, more particularly the sense lines, inhibit lines and control lines. The apparatus components in FIG. 2 will be described in groups associated with the various sets of lines.

A first system of time shared lines comprises the output lines of the storage register 50 and a set of $Z_1$ inhibit lines controlled by the contents of the storage register. Cables 80 and 82 are shown emerging from the storage register, of which cable 80 carries information regarding the lower order digits and cable 82 regarding the higher order digits. As part of the same general system, inhibit cables 81, 83 emerge from the switch block 52.

The cable 80 passes through a set of true-complement switches in block 84, to provide for either addition or subtraction, and thence to the storage register $Z_1$ inhibit switch and driver block 52. Thence cable 81 passes through an input-output address register 552 to be described below, a $Z_1$ error detection block 86, the instruction and data storage 40, a mask-shift functional matrix block 88, a multiplier-quotient (MQ) register 90, the adder 46, and thence to the output buffer 72.

The cable 82 passes directly to the storage register $Z_1$ inhibit switch and driver block 52. Thence cable 83 passes through the $Z_1$ error detection block 86, and the mask-shift functional matrix block 88 to the adder 46.

A second system of time shared lines comprises the output of the accumulator register 62 and a set of $Z_2$ inhibit lines controlled by the contents of the accumulator register. Cables 94 and 96 are shown emerging from the accumulator register and running to the $Z_2$ inhibit switch and driver block 64, which cables relate to the lower order and higher order digits respectively. Cables 95 and 97 emerge from the accumulator register $Z_2$ inhibit switch and driver block 64 and pass through a $Z_2$ error detection block 98 to the adder 46 and thence to the mask-shift matrix block 88.

A cable 99 is provided to transmit the data address digits from the program address register 60 to the $Z_2$ inhibit switch and driver block 64, for use when a program address is to be operated upon in the adder.

A third set of inhibit lines comprising five $Z_3$ lines in a cable 41 runs from an input register switch and driver block 100 to the input buffer 42. The block 100 receives an input from the input device 48 through an input translator 102.

A set of time shared word sense lines for the lower order digits, represented by a cable 104 originates in the instruction and data storage 40 and passes through the input buffer 42, the mask-shift matrix 88, the MQ register 90, the adder 46 and thence to a set of sense amplifiers 106. At the output of the sense amplifier block 106, the cable 104 branches. A branch goes to the program address register 60 through a program address register gate block 108. Another branch goes to a program index address register 61 through a program index address register gate block 109. Other branches go respectively to a mask-shift register 57 through a mask-shift register gate block 107; to an operation code register 63 through an operation code register gate block 120, to the accumulator register 62 through an accumulator register gate block 112, to the storage register 50 through a storage register gate block 114, and to an MQ digit register 116 through an MQ digit register gate block 115. An addressing control cable 123 runs from the operation code register 63 to an operation word storage block 92 and the output of the block 92 is connected by a cable 93 to a control pulse generator 188.

A set of time shared word sense lines for the higher order digits, represented by a cable 118 originates in one of the functional matrices, here the mask-shift matrix 88, and passes through the adder 46 and the sense amplifier block 106 and then branches, one branch going through the accumulator register gate block 112 to the accumulator register 62 and another branch going through the storage register gate block 114 to the storage register 50.

A set of carry sense lines represented by a cable 124 originates in the adder 46 and passes through the sense amplifier block 106 and thence through a carry register gate block 128 to a carry register 130.

A single digit sense cable 132 originates in the output buffer 72 and passes through a sense amplifier gate block 134 and a sense amplifier block 136 to an output register and switch block 138 and thence to the output device 74 by way of an output translator 140.

A cable 142 of X driver lines originates in the X select switch block 54 which in FIG. 2 is called the 0–9 memory address switch and driver block. The cable 142 runs to the instruction and data storage 40. A cable 144 of Y driver lines originates in the Y select switch block 56 which in FIG. 2 is called the 000–900 memory address switch and driver block and runs to the block 40.

A plurality of additional control lines are shown in FIG. 2. One set of control lines represented by a cable 170 originates in the control pulse generator block 188 and distributes lines to switches, gates, etc., wherever control pulses are needed in various parts of the system. Some of the connections from cable 170 are indicated in the figure.

Another set of control lines represented by a cable 174 originates in the program address register 60 and distributes control lines to the switch blocks 54 and 56, and the 00–90 and 0000–9000 switch and gate blocks 58, 59. Still another set represented by a cable 175 runs from the program index address register 61 to the blocks 54, 58. A control cable 177 runs from the mask-shift register 57 to 0–9 and 000–900 memory address switch and driver blocks 54 and 56, for control of the mask-shift matrix block 88.

A primary cycle timing system is shown which is controlled by an oscillator or clock 182 which in turn energizes a primary timer 184. Pulses from the timer 184 are supplied over a cable 186 to the operation word storage block 92.

Other control lines include a line 192 connecting the 0–9 instruction counter 176 to the 0–9 switch block 54, a line 194 connecting the 000–900 instruction counter 178 to the 000–900 switch block 56, and cables 195 and 196 connecting the 00–90 and 0000–9000 instruction counters 180 and 181 respectively to the respective gates in the blocks 58 and 59. A line 198 connects the $Z_1$ error detector 86 with an error trigger 200, and a line 202 connects the $Z_2$ error detector 98 with an error trigger 204.

A write pulse line for carry digits is shown at 208 running from the carry register 130 to cable 80. A single digit cable 212 runs from the MQ digit register 116 to the cable 80.

The input-output address register 552 mentioned above as being inserted in the cable 81 is controlled by the $Z_1$ inhibit switch and driver block 52 and also by a $Z_4$ inhibit switch and driver block 548. A regenerative cable 550 connects the block 548 to the input-output address register 552, the thence via a sense amplifier block 553 and an input-output address register block 554 back to the input of the $Z_4$ inhibit block 548. An address cable 556 runs from the input-output address register 554 to the memory address units 54, 56, and an address cable 557 runs from the register 554 to the switch and gate blocks 58, 59.

Address switch and driver blocks 47 for the X coordinate and 49 for the Y coordinate may be provided for addressing the input-output control address register 552 under the control of the input device 48. Output buffer 72 may be addressed by the X and Y blocks 54, 56, although for clarity in the drawing separate X and Y blocks 69 and 71 respectively are shown.

Components which may comprise three-dimensional arrays of elements, such as the memory unit 40, input buffer 42, adder 46, mask-shift matrix unit 88, etc., are shown as three-dimensional boxes or blocks, whereas other components are shown as rectangles.

FIG. 3 shows a preferred form of alpha-numeric code for use with a computer of the type described herein. The code uses combinations of five bits designated the 0, 1, 2, 3 and 6 bits respectively, to represent the decimal digits 0 through 9 and to represent alphabetic characters. The code is a 2-out-of-5-bit code, in that each coded digit is represented by a combination of exactly two of the five bits. As there are exactly ten ways of combining five objects two at a time without regard for the order in which the objects appear, a 2-out-of-5 code is well suited to representing the ten decimal digits. The code shown in FIG. 3 has the convenient property that the sum of the numbers by which the two bits are designated is equal to the decimal digit which the combination represents. For example, 3 is represented by bits 1 and 2, 6 is represented by bits 0 and 6, 9 is represented by bits 3 and 6, etc. It will be noted that with the single exception of the decimal digit 3 there is one and only one way of forming each decimal digit with this property. The decimal digit 3 may be formed either by bits 1 and 2 or by bits 0 and 3. It will also be noted that there is no combination of two of the five bits that sums up to zero. The problem may be resolved by using one of the 3-combinations to represent zero. A mnemonic choice is made in FIG. 3 wherein 0 and 3 represents zero and 1 and 2 represents 3. Alphabetic characters are represented by combinations of two coded decimal digits.

Figure 4A:
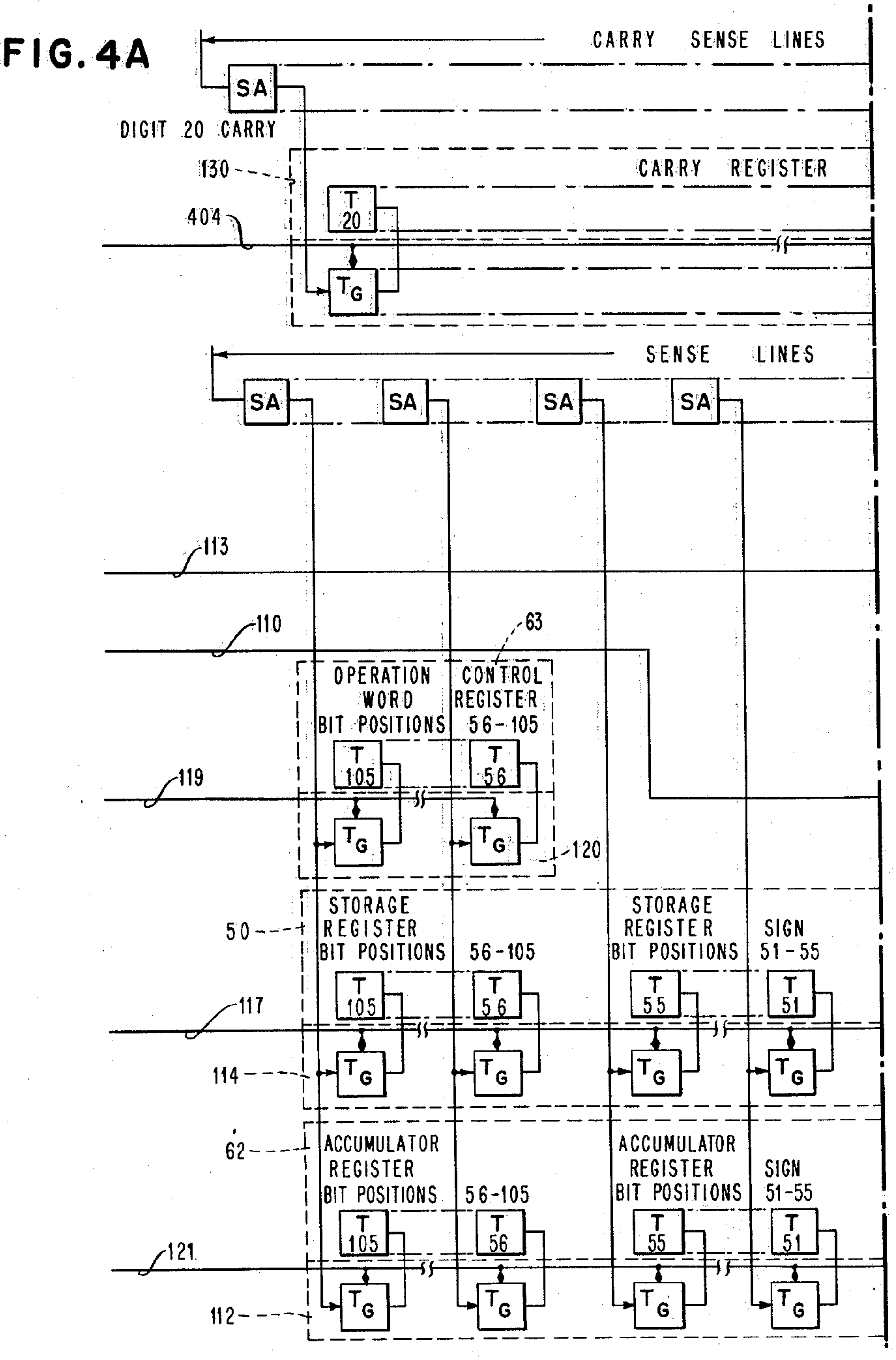
Figure 4B:
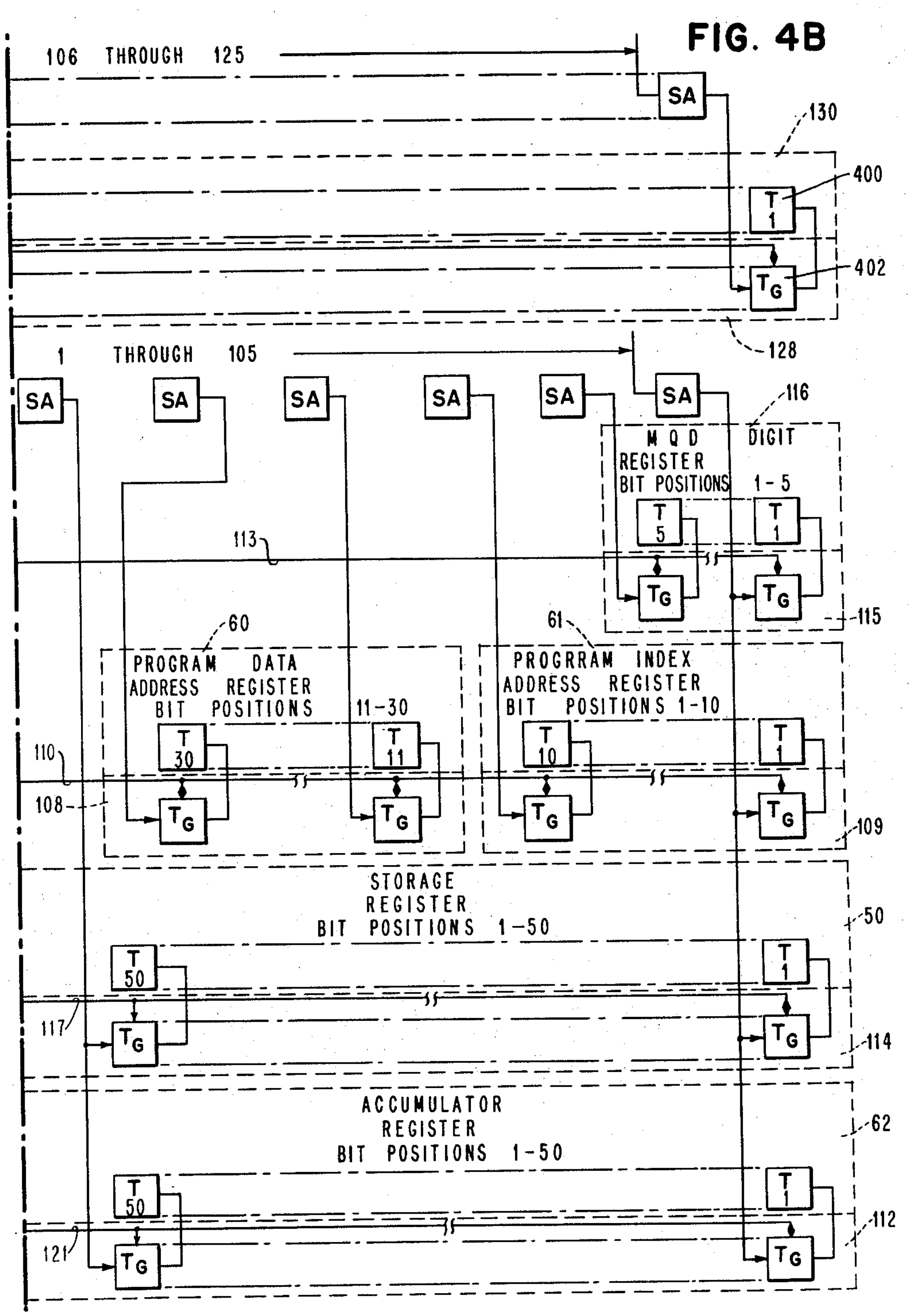

FIGS. 4A and 4B illustrate how the sense lines such as those coming out of the sense amplifier block 106 may be time shared by a plurality of registers.

In these figures, carry digits for each of 20 decimal places as well as the bits for a sign and a ten-digit word are shown as being accommodated in sense amplifiers numbered from 1 through 125. Pulses representing the carry digits may be received from the sense amplifiers 106 through 125 in the block 106 and may be gated into the register 130 by means of the carry register gate 128 as shown in FIG. 4A. This gating is accomplished by providing each trigger such as trigger 400 with a trigger gate circuit such as 402 . A lead 404 is provided which is connected to the conditioning inputs of all the gate circuits of which 402 is an example. When it is desired to register carry digits in the carry register 130, a carry register gate pulse may be impressed upon the lead 404 to condition all the gate circuits so that when pulses are sent over the sense lines these pulses will actuate the triggers in the carry register 130.

By means of associated gates, as shown in FIG. 4, other registers may be served, for example, the MQ digit register 116 may be conditioned by means of the MQ digit register gate 115, the program index address register 61 by the index address register gate 109, the program data address register 60 by the program register gate 108, the operation code word register 63 by the operation code word register gate 120. The storage register 50 may be conditioned by means of the storage register gate 114, and the accumulator register 62 may be conditioned by means of the accumulator register gate 112. Input gate pulses for operating gates 115, 109, 120, 114, 112, may be applied over lines 113, 110, 119, 117, 121 respectively.

By means of the various input gates, information sent over the sense lines may be registered in any one or more of the various registers as needed in the course of computations and in the handling of data and instructions.

The block 46 of adder matrices is shown in more detail in FIG. 5 as comprising a total sum generator 406, a partial sum and initial carry generator 408, a negative and-circuit block 410 for indicating the absence of a decimal digit 9 (or, more general, radix minus one) and a propagated carry generator 412. A reset lead 414 and a write lead 416 are indicated for controlling blocks 406 and 408.

The two numbers that are to be added together are assumed to be stored respectively in the storage register 50 and in some other register, such as the accumulator register 62. For definiteness, the accumulator register 62 will be assumed to be the second register. The addition is carried out in four steps, of which the first step in a core matrix type of embodiment is to combine the two numbers digit by digit in a plurality of matrices within the partial sum and initial carry generator 408, over inhibit lines 580 from storage register 50 to partial sum and initial carry generator 408 and over inhibit lines 582 and 584 from the accumulator register 62 to the generator 408 via the total sum generator 406. Generator 408 determines for each digit position (*a*) the sum of two digits without regard to carry, and (*b*) the presence or absence of a carry. These results are called partial sum and initial carry respectively. There is a partial sum for each digit position and there may or may not be an initial carry from each.

In the second step, the partial sums are read out of the partial sum and initial carry generator 408 into the accumulator register over digit sense lines 586 and the initial carries are read out of the partial sum and initial carry generator into the carry register 130 over carry sense lines 588. The accumulator register is automatically cleared before the partial sums are read in, so that the accumulator register now registers the partial sum where it previously registered one of the numbers to be added. This partial sum will be augmented in the fourth step by the initial carries and by the propagated carries, if any, under the control of the carry register 130.

In the third step, information concerning the presence or absence of a nine in each digit position of the partial sum is read into the propagated carry generator 412 from the accumulator register 62 over inhibit lines 582, 584, 590, 592, via the negative and-circuit block 410 and generators 408 and 406. At the same time, the initial carries are read into the propagated carry generator over carry sense lines 594 and 596 via the generator 406. Also simultaneously with this process, all the partial sums are read over the inhibit lines 582 into the total sum generator 406 where each digit is automatically increased by one in anticipation of a possible carry into each digit position. By increasing by one here is meant that 0 is turned to 1, 1 to 2, etc, and that 9 is turned to 0, without carry. This augmented sum will be selectively utilized or not, digit by digit as required, when it comes to the final step, in order to take account of carry where a carry is needed and cancel the anticipated carry where no carry is actually called for. This is done under the control of triggers in the carry register 130. Also in this step, the propagated carries are generated in the propagated carry generator 412 and are transmitted to the carry register 130 over carry sense lines 598 and 588.

In the fourth step, certain of the digits registered in the total sum generator 406 are read out of that generator into the accumulator register over digit sense lines 600 and 586 under the control of pulses from the carry register 130 coming over the carry write lines 594. Only those digit positions in the accumulator register will receive an output from the total sum generator for which the carry register shows a carry. The remaining digit positions in the accumulator register retain the partial sum digits which were put there in the second step. These latter digits have not been increased by any anticipated carry. The result is that the accumulator is now set to the true sum of the two numbers added.

The above-described process of addition will be explained by means of the following numerical example:

390989997
152020008
———————
543010005

The partial sum without regard to carries is:

442909995 and the initial carries are:

100100010

The propagated carries are:

001011100

It will be noted that where there is an initial carry and a partial sum of 9 in the same decimal order there is a propagated carry developed and that this carry propagates until it reaches a decimal order in which the partial sum is not a nine and stops there. In general, for any radix, the carry propagates until it reaches a digit position in which the partial sum differs from the radix less one. The final list of carries is found by combining the initial carries and the propagated carries, the result of which in the present example is:

101111110

Now if each digit of the partial sum is increased by one without regard to carry the result is:

553010006

It will be noted that if the digit in the partial sum is retained in each decimal order for which there is no carry and if the digit increased by one is used in each decimal order for which there is a carry, either initial or propagated, then the correct result is obtained:

-4———5
5–301000–
———————
543010005

FIG. 6 shows illustrative details of the wiring between the component parts of the adder matrix block 46 and of the wiring to the block 46 from other parts of the computer. The component partial sum and initial carry generator 408 of FIG. 5 comprises a separate core matrix for each digit position. In FIG. 6 a few of these matrices are shown as represented by blocks and are labeled 408*a*, 408*b*, 408*s*, and 408*t*, for the digit positions 1, 2, 19 and 20, respectively. Similarly, the total sum generator 406 comprises a separate core matrix for each of the digit positions. In FIG. 6, blocks 406*a*, 406*b*, 406*s*, 406*t*, represent the total sum matrices for the digit positions 1, 2, 19 and 20 respectively. The no-9 negative and-circuit block 410 of FIG. 5, comprises one negative and-circuit for each digit position except the first, which has no need for such a circuit. In FIG. 6, blocks 410*b*, 410*s*, 410*t*, represent the no-9 negative and-circuits for the digit positions 2, 19, 20, respectively. The carry register 130 comprises carry triggers, one for the carry from each digit position. In FIG. 6, blocks 130*a*, 130*b*, 130*s*, 130*t*, represent the triggers for carries originating in the digit positions 1, 2, 19, 20, respectively. To effect the control of the carry triggers over the reading out operation from the total sum generator to the accumulator register, a plurality of negative and-circuits are used. In FIG. 6, blocks 418*a*, 418*b*, 418*s*, 418*t*, represent these negative and-circuits for the digit positions 1, 2, 19, 20, respectively.

Lines 1 to 50, inclusive, in the cable 81 and lines 56 to 105, inclusive, in the cable 83 from the $Z_1$ inhibit block 52 connect to the $Z_1$ Y-inhibit input lines in FIG. 6 for the digit positions 1 through 20. Lines 1 through 5 connect to the 6, 3, 2, 1, 0 inhibit input lines respectively of partial sum and initial carry generator block 408a. Lines 6 through 10 connect to the 6, 3, 2, 1, 0 inhibit input lines respectively of block 408b, etc. Lines 96 through 100 connect to the 6, 3, 2, 1, 0 inhibit input lines respectively of block 408s. Lines 101 through 105 connect to the 6, 3, 2, 1, 0 inhibit input lines respectively of block 408t. By this means the pattern of inhibit currents determined by the number in the storage register is impressed upon the Y dimension of the adder.

In a similar manner, a pattern of inhibit currents determined by the number in the accumulator register 62 is impressed upon the X dimension of the adder over wires in the cables 95 and 97 controlling $Z_2$ drivers in the block 64. The $Z_2$ inhibit wires pass through the total sum generator blocks on the way to the partial sum and initial carry generator blocks so that the inhibit currents are available to either the blocks 406a, etc., or the blocks 408a, etc. In each total sum block 406a, etc., a set of sense wires S–0, S–1, S–2, S–3, S–6, of one of the cables 104, 118 (FIG. 2) pass through and are made available for use in the associated block 408a, etc., respectively, and pass thence, among other places, to the accumulator register 62.

The $Z_2$ inhibit wires for each decimal position are labeled respectively I–0, I–1, I–2, I–3, I–6. In each decimal position except the first, the inhibit wires I–3 and I–6, which jointly represent the decimal digit 9, pass through the partial sum and initial carry generator block in the respective digit position and enter the no-9 negative and-circuit for that digit position. For example, the I–3 and I–6 wires which pass through the total sum block 406b, continue through the partial sum and initial carry generator block 408b to the no-9 negative and-circuit 410b. Each partial sum and initial carry generator block 408a, etc., contains a carry sense wire 422a, etc., which runs by way of the propagated carry generator 412 and wires 436a, etc., to an associated carry sense amplifier in the sense amplifier block 106a. It will be understood that the carry sense amplifiers control the carry register triggers as is shown in FIG. 6 and also in FIG. 4, through the intermediary of the carry register gate 128 although for simplicity the gate is omitted in FIG. 17.

Each negative and-circuit 418a, etc., is conditioned by the associated carry trigger 130a, etc., so that when a timing pulse is received over a line 107, and a carry is simultaneously present, a digit may be read out of the associated total sum generator into the accumulator register. If no carry is present, the digit will not be read out of the total sum generator.

In case a carry is generated in the twentieth digit position a pulse is sent from the negative and-circuit 418t to an overflow indicator 472 to indicate that the capacity of the adder has been exceeded. The overflow indicator may also be used as a high order carry signal in division, to indicate the need for a shift in the divisor, as will be explained below, and as a high order carry signal in subtraction to distinguish between positive and negative differences.

To transfer initial carries to the propagated carry generator at proper times another set 419a, 419b, etc., of negative and-circuits is provided. Each of these negative and-circuits is conditioned by the associated carry trigger 130a, etc., so that when a timing pulse is received over a line 109, and a carry is simultaneously present, a pulse is transmitted to the propagated carry generator 412.

Figure 7:
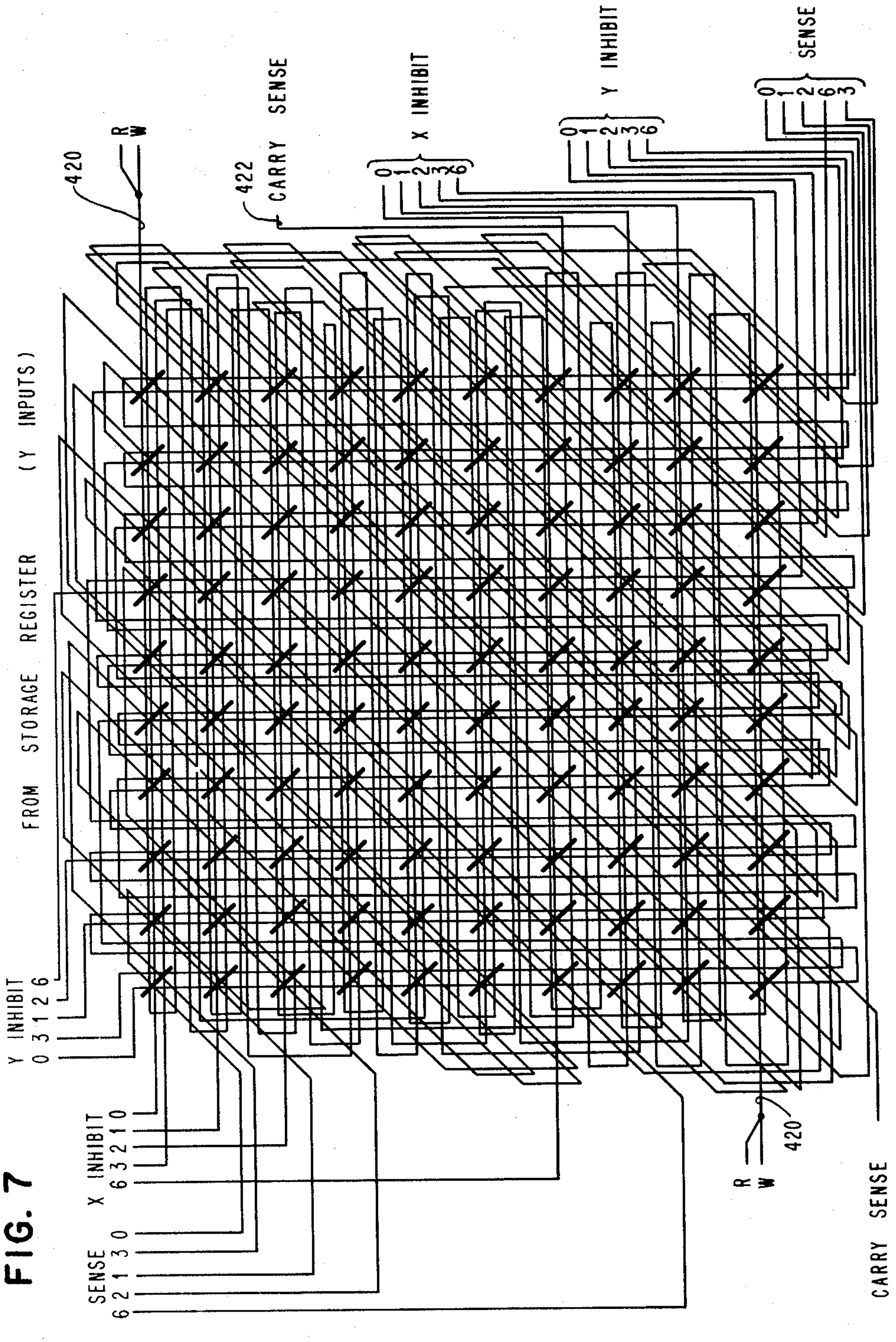
FIG. 7 is a wiring diagram of a partial sum and initial carry generator which may form part of the adder shown in FIGS. 5 and 6.

FIG. 7 shows the wiring scheme of a representative core matrix in the partial sum and initial carry generator. This matrix is used to add together two decimal digits to determine a partial sum digit and an initial carry, if any, in accordance with the arithmetical addition table shown in FIG. 8. One matrix like that shown in FIG. 7 is provided for each digit position, each matrix requiring a ten by ten array of cores. Each core is threaded by two X inhibit wires and two Y inhibit wires. Each core which represents a partial sum without a carry is threaded by two sense wires and each core which represents a partial sum plus a carry is threaded by two digit sense wires and a carry sense wire 422. In addition, each of the one hundred cores is threaded by a read wire and by a write wire. In FIG. 7, the read and write wires are shown joined into a cable 420 which threads through all the cores of the matrix.

The wiring scheme is determined by the addition table of FIG. 8 together with the numeric code of FIG. 3. For example, the X inhibit wires 0 and 3 pass together through all the cores in the top row, for representing a 0 decimal digit in the accumulator register. The X inhibit wires 0 and 1 pass together through all the cores in the next row, for representing a 1 decimal digit in the accumulator register. In the tenth column, at the extreme right, the Y inhibit wires 3 and 6 thread through all the cores in the column, for representing a decimal digit 9 in the storage register. The sense wires pass through the cores in diagonal lines from lower left to upper right or vice versa. Sense lines 1 and 6, for example, for representing a partial sum of 7, pass together through all the cores which according to FIG. 8 produce a partial sum of 7, either 7 with no carry or 17 which gives a partial sum of 7 with one to carry. The carry sense wire threads through all the cores in those positions which represent a partial sum of more than nine, i.e., 10 through 18.

In the system illustrated, digits are indicated by the absence of inhibit current. Therefore, to add two digits, such as a 4 in the storage register to a 3 in the accumulator, for example, there must not be any current flowing in the X and Y inhibit lines representing these two digits. Thus, when a write pulse is generated in the adder by the read-write pulse generator, the only core in the matrix that is allowed to flip into the "one" state is that one through which are threaded the 1 and 3 Y-inhibit lines representing the 4 and the 1 and 2 X-inhibit lines representing the 3. This core is in the fifth column and fourth row of the matrix as shown in FIG. 7. This action constitutes the generation of a partial sum. There is no inhibit current flowing in any wire threading this core, whereas inhibit current is flowing in at least one wire in all the other cores.

When a read pulse is sent into the adder, the partial sum, 7 in the present example, is read out on the diagonal sense lines 6 and 1 that spread through all the cores which represent partial sums of 7 or 17. The sum 7 is passed to the accumulator register. In cases where the partial sum is more than 9, the flipping action of the core is also detected by the carry sense line 422. This action constitutes the generation of an initial carry. At the same time that the partial sum is read out into the accumulator register, the carry, if there be one, is read out into the appropriate trigger of the carry register. In the carry register, the triggers which are set on will later control what is read from the total sum generator into the accumulator register. On the next cycle point, both the partial sums that are less than 9 and the initial carries are utilized in the propagated carry generator. There the propagated carries are generated and deposited into the carry register. While the propagated carries are being generated, all of the partial sums are brought into the total sum generator over the $Z_2$ inhibit lines and in the total sum generator the digit in each digit position is automatically increased by one in anticipation of the carry that might be generated for it. Increasing the digit by one is accomplished by having the two inhibit lines that control writing thread through the same core that the next higher digit sense lines do. This wiring arrangement is illustrated in FIG. 12. On the next cycle point, all the triggers that were set on by either the initial carry generators or the propagated carry generator allow outputs to be read from the total sum generators into the accumulator register. Digits in digit positions for which there is no carry remain unchanged in the accumulator register. This action sets the accumulator register to the true sum of the two numbers to be added.

*Propagated carry generation*

FIG. 9 shows the wiring of a core matrix for the propagated carry generator 412. The cores are arranged in a triangular array with 19 cores in the top row and with the number of cores decreasing by one in each row down to a single core at the bottom. The lines 424*a*, 424*b*, etc., shown in FIG. 6 as coming out of the negative and-circuits 419*a*, 419*b*, etc., respectively, enter the matrix of FIG. 9 as carry write lines which run diagonally through the matrix. The carry write line 424*a* associated with the first digit position in the initial carry generator threads through the 19 cores in the righthandmost diagonal row of cores in FIG. 9. The carry write line 424*b* associated with the second digit position in the initial carry generator threads through the 18 cores of the next diagonal row toward the left, etc., carry write line 424*s* from the nineteenth digit position in the initial carry generator threading through the single core in the upper lefthand corner of the matrix. A cable 430 threads through all the cores diagonal row by diagonal row. The cable 430 is made up of lines from the respective no-9 negative and-circuits 410*b*, etc., 410*s*, 410*t*, shown in FIG. 6, a line 432*b* coming from block 410*b*, a line 432*s*, from block 410*s*, a line 432*t* from block 410*t*, etc. Each of the lines 432*b*, etc., carries an inhibit pulse if and only if the digit position which the line represents has a partial sum that is not a 9. The constituency of the lines in the cable 430 changes from core to core along the route of the cable, according to a wiring scheme which is shown more clearly in diagrammatic form in FIG. 10. A write-reset cable 434 threads through every core in the entire matrix. Carry sense lines 436*b*, 436*c*, etc., each thread through the cores in a respective vertical column of cores. These carry sense lines connect to the carry sense amplifiers in the block 106, which in turn control the carry triggers 130*a*, 130*b*, etc. (FIG. 6).

In FIG. 10, each core of the matrix shown in FIG. 9 is represented by a small rectangle. The carry sense lines are shown as vertical lines, each sense line connecting the rectangles which represent those cores which are threaded by the given sense line. In each rectangle, the upper line of notation indicates the number of the carry write line 1C, 2C, 3C, etc., which threads through the core that the rectangle represents. The lower line of notation in each rectangle indicates which of the no-9 inhibit lines thread through the core that the rectangle represents. For example, 2–3 in the lower line of notation indicates that the no-9 inhibit lines of the second and third digit positions are threaded, 4–14 indicates that the no-9 inhibit lines of the fourth through fourteenth digit positions are threaded, etc.

FIG. 11 shows a carry propagation scheme of the same type as that shown in FIGS. 9 and 10 but simplified by limiting the number of decimal positions to six instead of twenty. At the top of the figure, the first six digit positions of a multidigit register are represented, each by five triggers corresponding respectively to the bits 0, 1, 2, 3, 6 of the code. This register may be the accumulator register 62 or any other register in which it is desired to accumulate the result of an adding operation. The triggers for the first or lowest order digit position appear in the righthand column, the triggers for the second digit position in the next column to the left, etc. In each column the triggers that are ringed are those which are set on as partial sums in the numerical example given above, representing the following decimal number according to the code of FIG. 3:

909995

Immediately below the accumulator register, the triggers for the first six digit positions in the carry register 130 are shown. The triggers that are ringed are those which are set on as initial carries in the numerical example, namely, a carry from the first digit position and a carry from the fifth digit position. In the numerical example, these carries were set down in the digit position *into which each is to be carried,* so that they were represented as follows:

0100010

Each carry register trigger 130*a*, 130*b*, etc., is arranged to condition one of a set of and-circuits 438*a*, 438*b*, etc. Such of these and-circuits as are conditioned may be actuated simultaneously by means of a carry register output gate pulse over a lead 440. Each of these and-circuits controls one of a set of inverters 442*a*, 442*b*, etc., which in turn controls one of a set of core drivers 444*a*, 444*b*, etc. Each of these core drivers controls one of the carry write lines 424*a*, 424*b*, etc.

A feature of the circuit of FIG. 11 as compared to the circuit of FIG. 6 is an alternative way of utilizing the information regarding presence or absence of a digit 9 in the partial sum. In FIG. 11, the state of the number 3 and number 6 triggers in the accumulator register is employed for this purpose instead of the state of the number 3 and number 6 inhibit lines as was done in the circuit of FIG. 6.

In each digit position in the accumulator register the number 3 trigger and the number 6 trigger are connected to one of a set of and-circuits 446*b*, 446*c*, etc. Any one or more of these and-circuits may be actuated to produce a positive output potential if and only if a partial sum of 9 is present in the associated digit position in the accumulator register. If not actuated, the and-circuit produces a negative output potential. Each of these and-circuits is connected to one of a set of negative and-circuits, actually or-circuits, 450*b*, 450*c*, etc., each of which in turn is connected to one of a set of core drivers 452*b*, 452*c*, etc. Each of the core drivers 452*b*, 452*c*, etc., controls one of the no-9 inhibit lines 432*b*, 432*c*, etc.

In the numerical example given above, the first carry trigger 130*a* is set on. This conditions the and-circuit 438*a*. When the carry register output gate pulse is received, the and-circuit 438*a* is actuated to pass a positive pulse to the inverter 442*a*. In response to the pulse received, the inverter puts out a negative output pulse. With this negative pulse applied to its input, the core driver 444*a* is turned on. The result is that a write current is produced in the first carry write line 424*a*. In similar manner, the carry indicated by the fifth carry trigger results in the generation of a write current on the fifth carry write line. The absence of carries in the second, third, fourth and sixth carry triggers results in the absence of write currents in the second, third, fourth and sixth carry write lines. For example, the absence of a carry in the second carry register 130*b* produces a negative output pulse in the and-circuit 438*b*. The presence of a negative output pulse in the and-circuit 438*b* brings a positive response in the inverter 442*b* which prevents the core driver 452*b* from coming on.

In the numerical example, there is a 9 in the second digit position. As a result, the and-circuit 446*b* generates a positive pulse which passes through the or-circuit 450*b*. The core driver 452*b*, however, is of the type which responds only to a negative input. So, in the presence of the 9 in the second digit position, no inhibit current is applied to the no-9 inhibit line 432*b*. In similar manner, inhibit currents are prevented from being sent over the third, fourth and sixth no-9 inhibit lines. In this same example, there is no 9 in the fifth decimal position, the digit in this position being a zero. Triggers 3 and 0 are set on, but since the trigger 6 is not set on, the and-circuit 446*e* generates not a positive pulse, but a negative pulse instead. In the absence of a positive pulse at the input of the or-circuit 450*e*, the input to the core driver 452*e* remains negative and continually sends inhibit current over the fifth no-9 inhibit line.

When a write pulse is sent through all the cores over the write line in the cable 434, those cores in which a carry write pulse also passes through are set on if they are not inhibited. The cores that are set on in the example are the cores that are encircled in the figure. They are threaded respectively by the second, third, fourth and sixth carry sense lines. The application of a read pulse on the read line of the cable 434 causes propagated carries to be read into the carry sense amplifiers 106*b*, 106*c*, 106*d* and 106*f*.

It will be understood that the no-9 inhibit drivers 452*b*, etc., which operate under the control of a negative gate pulse applied to an or-circuit such as 450*b*, are typical of inhibit drivers in other parts of the system, for example, the inhibit drivers contained in blocks 52, 64, 100 and 548. In general, an inhibit driver is turned on when there is a coincidence of pulses in an associated switching circuit.

*Total sum generation*

FIG. 12 shows the wiring scheme for one digit position of the total sum generator 406. Ten cores are needed, two of which are designated 454 and 456, respectively. Each core is threaded by two $Z_2$ inhibit lines as from block 64 under the control of the information contained in the accumulator register 62. The two inhibit lines indicate a digit according to the code given in FIG. 3. Each core is also threaded by two sense lines. In each case, the sense lines indicate a digit one higher than the digit indicated by the inhibit lines threading the same core. For example, core 454 is threaded by inhibit lines 2 and 3, indicating a digit 5. This core is threaded by the sense lines 0 and 6, indicating the digit 6. The ten cores are threaded by each of a group of lines comprising a read line 458, a write line 460 and a carry read line 462. If there is no inhibit current on inhibit lines 2 and 3, indicating a 5 in the accumulator register, and a write pulse is impressed upon lead 460, only the one core 454 will flip, since all the other cores are threaded by at least one inhibit line carrying current, it being assumed that one inhibit curent alone is sufficiently strong to overcome the write pulse. It will be noted that the carry read pulse in the total sum generator is the same pulse that was called the carry write pulse in the propagated carry generator of FIG. 11. This carry pulse is applied during at least part of the time that the write pulse is applied to the total sum generator and these two pulses are opposed to each other in the core 454 for example. Accordingly, provision must be made to insure writing into the selected core in the total sum generator, as by making the write pulse stronger than or of longer duration than the carry read pulse, or using other measures of similar effect. Later, then, if a half-select read pulse is impressed upon the lead 458 simutaneously with a half-select carry read pulse on lead 462, only one core will respond, for example core 454. The core 454 will generate output pulses in the sense lines 0 and 6, indicating a digit 6. To take another case, that of the core 456, if the digit in the accumulator register is a 9, there will be inhibit currents on all the inhibit lines except lines 3 and 6. Now, the only core that can be written into is core 456 and when this core is read, it will generate output pulses on sense lines 0 and 3, indicating a zero. When no half-select pulse is present on the carry read line 462, no reading out from the total sum generator can occur.

*Subtraction*

Subtraction is accomplished in the adder by first generating the complement of the subtrahend and using that as an addend in an adding operation.

When any two numbers are to be combined in the adder, it will be understood that both may be positive numbers, both negative numbers or either one may be positive and the other negative. In general, one of the numbers may be obtained from a register, for example the accumulator register, and the other may be obtained from memory or from another register, for example the storage register. In any case, each number is accompanied by its algebraic sign to show whether it is positive or negative. An instruction will be provided which will specify whether the second number is to be added to or subtracted from the first number. A useful distinction may be made at this point between an instruction and an arithmetical operation. For example, when two numbers of the same algebraic sign are to be combined under an instruction to add, the resulting arithmetical operation may be regarded as addition, whether the numbers combined are both positive or both negative. An instruction to subtract a negative number from a positive number may be carried out by adding the two numbers without regard to sign and prefixing a positive sign to the answer, essentially an adding operation. Similarly, an instruction to subtract a positive number from a negative number results in what is essentially an adding operation. Likewise, when two numbers of the same algebraic sign are to be combined under an instruction to subtract the second from the first, the resulting arithmetical operation may be regarded as subtraction, whether the numbers combined are both positive or both negative. An instruction to add two numbers of opposite sign results in what is essentially a subtracting operation.

In what is essentially an adding operation, there is actually no subtrahend and no complementing operation is required. The problem of overflow does, however, occur, and the presence of an overflow is indicated by the overflow indicator 472 (FIG. 6).

In what is essentially a subtracting operation, the second number is a subtrahend regardless of whether it is positive or negative. Accordingly, the second number is complemented before it is sent to the adder. It will be noted that overloading never occurs in a subtracting operation as above defined. However, an overload signal will nevertheless be transmitted to the indicator 472 whenever the subtrahend is smaller in absolute magnitude than the minuend. Use may be made of overload signal and of the absence of an overload signal in the subtracting operation to determine when the algebraic sign of the difference computed by the adder is opposite from the algebraic sign of the minuend and when the difference computed by the adder must be complemented to obtain the true difference. It is found that when no overload signal is obtained the result computed by the adder must be complemented and given the opposite algebraic sign to that of the minuend. When the overload signal appears, the result computed by the adder is the true difference. It will be noted that if the overflow signal is regarded as a high order carry digit, this digit is to be disregarded in a subtracting operation, as the carry digit so obtained does not enter into the computation of the true difference.

Known comparison circuits may be used as needed to compare the algebraic signs of the numbers to be combined and to take account of the nature of the instruction, whether to add or subtract, in order to determine whether the arithmetical operation which will result from the given instruction is essentially an adding operation or a subtracting operation.

While illustrative forms of apparatus and methods in accordance with the invention have been described and shown herein, it will be understood that numerous changes may be made without departing from the general principles and scope of the invention.

What is claimed is:

1. In a digital computer for adding a multidigit addend to a multidigit augend, an adder, a multidigit accumulator register connected to said adder, a carry register connected to said adder, means for applying the addend and the augend to the adder to produce the partial sum for each digit without regard for carries in the accumulator and the initial carries for each digit, if any, in the carry register, means for simultaneously developing all the propagated carries and placing them in the carry register, and means for adding one unit to each of selected digits in the accumulator under control of the carry register.

2. In a digital computer for adding a multidigit addend to a multidigit augend, an adder, a multidigit accumulator register connected to said adder, a carry register connected to said adder, means for applying the addend and the augend to the adder to produce the partial sum for each digit without regard for carries in the accumulator and the initial carries for each digit, if any, in the carry register, a total sum device, means for adding one unit to each digit of the partial sum and storing the result in said total sum device, means for simultaneously developing all the propagated carries and placing them in the carry register, and means for reading selected digits from said total sum device into the accumulator under control of the carry register.

3. In a circuit for generating propagated carries in response to an adding operation producing a sum without regard to carries and initial carries for each digit position, an initial carry line for each digit position, a succession of cores on each of said carry lines, sense lines interconnecting predetermined cores in the different carry groups, inhibit lines indicative of a no radix minus one condition in the different digit positions of the sum interconnecting predetermined cores in the different carry groups, and means, interconnecting all of the cores, operative in accordance with energization of the carry lines and inhibit lines to produce an output on the different sense lines to indicate propagated carries.

4. In a carry generator, a sequence of cores, a drive line wound through all of said cores, a sequence of inhibit lines, the first inhibit line being wound through all of said cores, the second inhibit line being wound through the second core and each succeeding core, each further inhibit line being wound through its correspondingly numbered core and all succeeding cores, whereby when the drive line is pulsed only those cores are driven which precede the first core wound with an inhibit line that is pulsed.

5. In a carry generator, a plurality of groups of successive cores, a plurality of sense lines interconnecting individual cores of the groups in a predetermined pattern, a plurality of drive lines, there being one drive line for each group, said drive line being wound through each core of said group, a plurality of inhibit lines, each inhibit line being wound through a selected core in a group and all succeeding cores in said group, one or more of said inhibit lines also being wound through a selected core in a second group and all succeeding cores in said second group, means for selectively driving said drive lines, means for selectively pulsing said inhibit lines, whereby an output is produced on each sense line which is wound on a core that is driven by a drive line and which precedes the first core on said drive line which is wound with an inhibit line that is pulsed.

6. In a digital computer for adding a multidigit addend to a multidigit augend, an adder, means for applying the addend and the augend to said adder, means in said adder to produce the partial sum of said addend and said augend and to produce initial carries, a partial sum register, an initial carry register, a plurality of series of propagated carry indicators, a first series of said carry indicators comprising an indicator for the first or least significant digit position and an indicator for each more significant digit position, a second series of carry indicators comprising an indicator for the second or next more significant digit position and an indicator for each of the third and all succeeding digit positions, a third series of carry indicators comprising an indicator for each of the third and all succeeding digit positions, and other carry indicators similarly arranged for other digit positions up to and including a single indicator for the most significant digit position, means included in said partial sum register to distinguish between a digit equal to radix less one and any other digit, means controlled by the presence of an initial carry in said initial carry register in a given digit position to condition all indicators in the series of indicators that begins at the given digit position, and means controlled by the absence of a digit equal to radix less one to inhibit all the indicators in the series of indicators that begins at the given digit position from the first digit position that contains a digit not equal to radix less one on through all succeeding indicators in the series in question, whereby only those indicators may be actuated which are associated with a digit position in which a propagated carry occurs.

7. A core matrix propagated carry generator comprising initial carry write drive lines individual each to a different one of a plurality of digit positions 1 through $n-1$ in order of increasing significance, $n-1$ cores assigned to indicate carries propagated from digit position 1 to digit positions 2 through $n$ inclusive, respectively, coupled to the said drive line individual to digit position 1, $n-2$ cores assigned to indicate carries propagated from digit position 2 to digit positions 3 through $n$ inclusive, respectively, coupled to the said drive line individual to digit position 2, $n-3$ cores assigned to indicate carries propagated from digit position 3 to digit positions 4 through $n$ inclusive, respectively, coupled to the said drive line individual to digit position 3, and so forth up to and including a single core assigned to indicate a carry propagated from digit position $n-1$ to digit position $n$ coupled to the said drive line individual to digit position $n-1$, a plurality of inhibit lines each indicative of a partial sum digit equal to other than radix minus one, each of said inhibit lines being individual to a different one of the digit positions 2 through $n$ in order of increasing significance, the inhibit line associated with digit position 2 being coupled to cores in digit positions 2 through $n$ on the drive line associated with digit position 1, the inhibit line associated with digit position 3 being coupled to cores in digit positions 3 through $n$ on the drive line associated with digit position 1 and cores in digit positions 3 through $n$ on the drive line associated with digit position 2, the inhibit line associated with digit position 4 being coupled to cores in digit positions 4 through $n$ on the drive line associated with digit position 1 and cores in digit positions 4 through $n$ on the drive line associated with digit position 2 and cores in digit position 4 through $n$ on the drive line associated with digit position 3, and so forth up to and including the inhibit line associated with digit position $n$ which is coupled to the cores in digit position $n$ on each of the drive lines associated with digit positions 1 through $n-1$.

8. In a core matrix for generating propagated carries from a partial sum computed without regard to carries and from a set of initial carries, in combination, a plurality of drive lines each controlled by an initial carry originatng in a different one of a plurality of digit positions 1 through $n-1$ in order of increasing significance, said drive lines being referred to herein by the number of the initial carry digit position to which each drive line is individual, a plurality of cores each coupled to one and only one of said drive lines, each core coupled to a given drive line being assigned to indicate a propagated carry originating in a particular digit position, each core being identified herein by the number of the drive line to which it is coupled together with the number of the digit position to which it is assigned, a plurality of inhibit lines each controlled by the digit value of the partial sum in a different one of the digit positions 2 thorugh $n$, according to whether digit in the digit position in question is equal to the radix minus one or not, said inhibit lines being referred to herein by the number of the associated digit position, inhibit line 2 being coupled to the cores 2 through $n$ on drive line 1, inhibit line 3 being coupled to cores 3 through $n$ on drive lines 1 and 2, inhibit line 4 being coupled to cores 4 through $n$ on drive lines 1 through 3 and other inhibit lines correspondingly arranged up to and including inhibit line $n$ which is coupled to core $n$ on all the drive lines 1 through $n-1$.

9. In a digital computer for adding a multidigit addend to a multidigit augend, in combination, an adder of a type the develops a partial sum digit for each digit position of the sum without regard to carry and which separately indicates an initial carry in each digit position in which a carry originates, a register for said partial sum, a carry register for said initial carries, means for applying information defining said addend and said augend to said adder to develop said partial sum and said initial carries and to place the resultant information in said respective registers, means controlled by both said registers to develop all resultant propagated carries and to register said propagated carries in said carry register together with said initial carries, and means controlled by said carry register following the registering therein of the propagated carries for advancing by one digit the partial sum in each digit position into which a carry is required as indicated by the presence of a carry in the carry generator, including an advance from radix minus one to zero in every case where the partial sum is equal to the radix minus one and a carry is indicated by the carry register, all said advancing being done without introducing any further carries, the digits of said partial sum which are not so advanced remaining without change, whereby the said partial sum contained in the register therefor is converted into the true sum of said addend and said augend.

References Cited in the file of this patent

UNITED STATES PATENTS

| | | |
|---|---|---|
| 2,879,001 | Weinberger et al. | Mar. 24, 1959 |
| 3,069,086 | Papo | Dec. 18, 1962 |